(12) United States Patent
Voo

(10) Patent No.: US 8,188,784 B1
(45) Date of Patent: May 29, 2012

(54) POWER CIRCUIT

(75) Inventor: Thart Fah Voo, Singapore (SG)

(73) Assignee: Marvell International Ltd., Hamilton (BM)

( * ) Notice: Subject to any disclaimer, the term of this patent is extended or adjusted under 35 U.S.C. 154(b) by 0 days.

(21) Appl. No.: 13/008,682

(22) Filed: Jan. 18, 2011

Related U.S. Application Data

(62) Division of application No. 11/903,051, filed on Sep. 20, 2007, now Pat. No. 7,872,372.

(60) Provisional application No. 60/826,435, filed on Sep. 21, 2006.

(51) Int. Cl.
  *G05F 1/10* (2006.01)
  *G05F 3/02* (2006.01)
(52) U.S. Cl. ...................................................... 327/540
(58) Field of Classification Search .................. 323/283; 307/52, 60; 327/107, 540
  See application file for complete search history.

(56) References Cited

U.S. PATENT DOCUMENTS

| 3,704,381 | A | | 11/1972 | Nercessian | |
|---|---|---|---|---|---|
| 5,055,767 | A | | 10/1991 | Nelson | |
| 5,491,387 | A | * | 2/1996 | Saito | 315/307 |
| 6,680,604 | B2 | * | 1/2004 | Muratov et al. | 323/283 |
| 7,446,683 | B2 | | 11/2008 | Perner | |
| 7,872,372 | B1 | * | 1/2011 | Voo | 307/52 |

* cited by examiner

*Primary Examiner* — Jue Zhang

(57) ABSTRACT

A system for providing a desired power to a load. The system includes: a current detection module configured to generate a current signal based on a current flowing through the load; a voltage detection module configured to generate a voltage signal based on a voltage across the load; a multiplier module configured to generate an output signal based on an analog multiplication of i) the current signal and ii) the voltage signal; a comparing module configured to perform a comparison of the output signal to a power reference signal, wherein the power reference signal is based on the desired power; and a voltage source configured to control the voltage across the load based on the comparison of the output signal to the power reference signal.

19 Claims, 19 Drawing Sheets

POWER CIRCUIT

CROSS-REFERENCE TO RELATED APPLICATIONS

This application is a divisional of U.S. application Ser. No. 11/903,051, filed Sep. 20, 2007, which claims priority under 35 U.S.C. §119(e) to U.S. Provisional Application No. 60/826,435, filed on Sep. 21, 2006. The disclosures of the applications referenced above are incorporated herein by reference.

FIELD

The present disclosure relates to a constant power circuit for delivering a power to a load.

BACKGROUND

The background description provided herein is for the purpose of generally presenting the context of the disclosure. Work of the presently named inventor, to the extent it is described in this background section, as well as aspects of the description that may not otherwise qualify as prior art at the time of filing, are neither expressly nor impliedly admitted as prior art against the present disclosure.

Referring now to FIG. 1, a functional block diagram of a hard disk drive (HDD) 100 is presented. The HDD 100 includes a hard disk assembly (HDA) 101 and an HDD printed circuit board (PCB) 102. The HDA 101 may include a magnetic medium 103, such as one or more platters that store data, and a read/write device 104. The read/write device 104 may be arranged on an actuator arm 105 and may read and write data on the magnetic medium 103.

Additionally, the HDA 101 includes a spindle motor 106 that rotates the magnetic medium 103 and a voice-coil motor (VCM) 107 that actuates the actuator arm 105. The VCM 107 may control the height of the read/write device 104 above the magnetic medium 103. This is referred to as flyheight control, and may use a constant power single-ended signal. A preamplifying device 108 amplifies signals generated by the read/write device 104 during read operations and provides signals to the read/write device 104 during write operations.

The preamplifying device 108 provides bias power to the read/write device 104. The read/write device 104 may include a magnetoresistive (MR) head, which may be a giant MR head. The preamplifying device 108 may bias the MR head with a differential signal having minimal common mode voltage. To maintain a uniform bias, the differential signal may deliver a constant power to the MR head.

The HDD PCB 102 includes a read/write channel module (hereinafter, "read channel") 109, a hard disk controller (HDC) module 110, a buffer 111, nonvolatile memory 112, a processor 113, and a spindle/VCM driver module 114. The read channel 109 processes data received from and transmitted to the preamplifying device 108. The HDC module 110 controls components of the HDA 101 and communicates with an external device (not shown) via an I/O interface 115. The external device may include a compute a multimedia device, a mobile computing device, etc. The I/O interface 115 may include wireline and/or wireless communication links.

The HDC module 110 may receive data from the HDA 101, the read channel 109, the buffer 111, nonvolatile memory 112, the processor 113, the spindle/VCM driver module 114, and/or the I/O interface 115. The processor 113 may process the data, including encoding, decoding, filtering, and/or formatting. The processed data may be output to the HDA 101, the read channel 109, the buffer 111, nonvolatile memory 112, the processor 113, the spindle/VCM driver module 114, and/or the I/O interface 115.

The HDC module 110 may use the buffer 111 and/or nonvolatile memory 112 to store data related to the control and operation of the HDD 100. The buffer 111 may include DRAM, SDRAM, etc. Nonvolatile memory 112 may include any suitable type of semiconductor or solid-state memory, such as flash memory (including NAND and NOR flash memory), phase change memory, magnetic RAM, and multi-state memory, in which each memory cell has more than two states. The spindle/VCM driver module 114 controls the spindle motor 106 and the VCM 107. The spindle/VCM driver module 114 may provide a constant power single-ended signal to the VCM 107 for consistent flyheight control. The HDD PCB 102 includes a power supply 116 that provides power to the components of the HDD 100.

SUMMARY

A system for providing a desired power to a load. The system comprises: a current detection module configured to generate a current signal based on a current flowing through the load; a voltage detection module configured to generate a voltage signal based on a voltage across the load; a multiplier module configured to generate an output signal based on an analog multiplication of i) the current signal and ii) the voltage signal; a comparing module configured to perform a comparison of the output signal to a power reference signal, wherein the power reference signal is based on the desired power; and a voltage source configured to control the voltage across the load based on the comparison of the output signal to the power reference signal.

Further areas of applicability of the present disclosure will become apparent from the detailed description provided hereinafter. It should be understood that the detailed description and specific examples, while indicating the preferred embodiment of the disclosure, are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
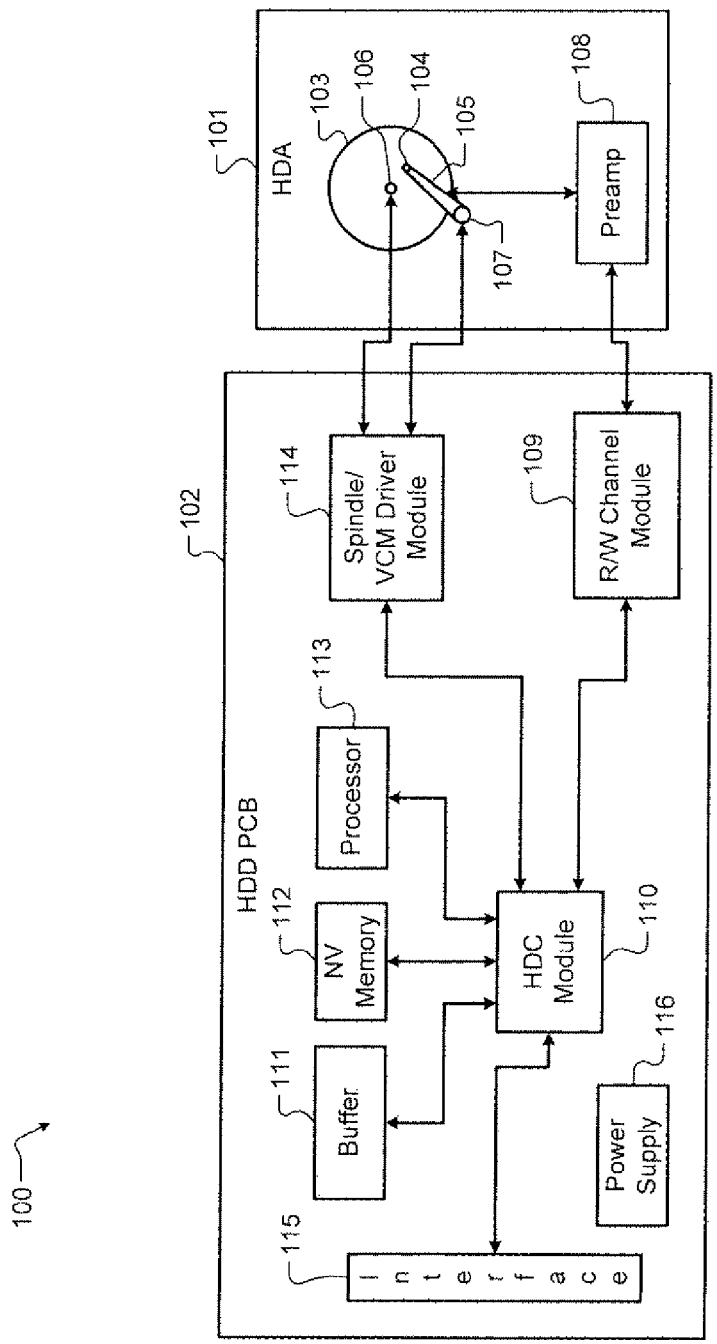
FIG. 1 is a functional block diagram of a hard disk drive (HDD) according to the prior art.

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality.

Figure 2:
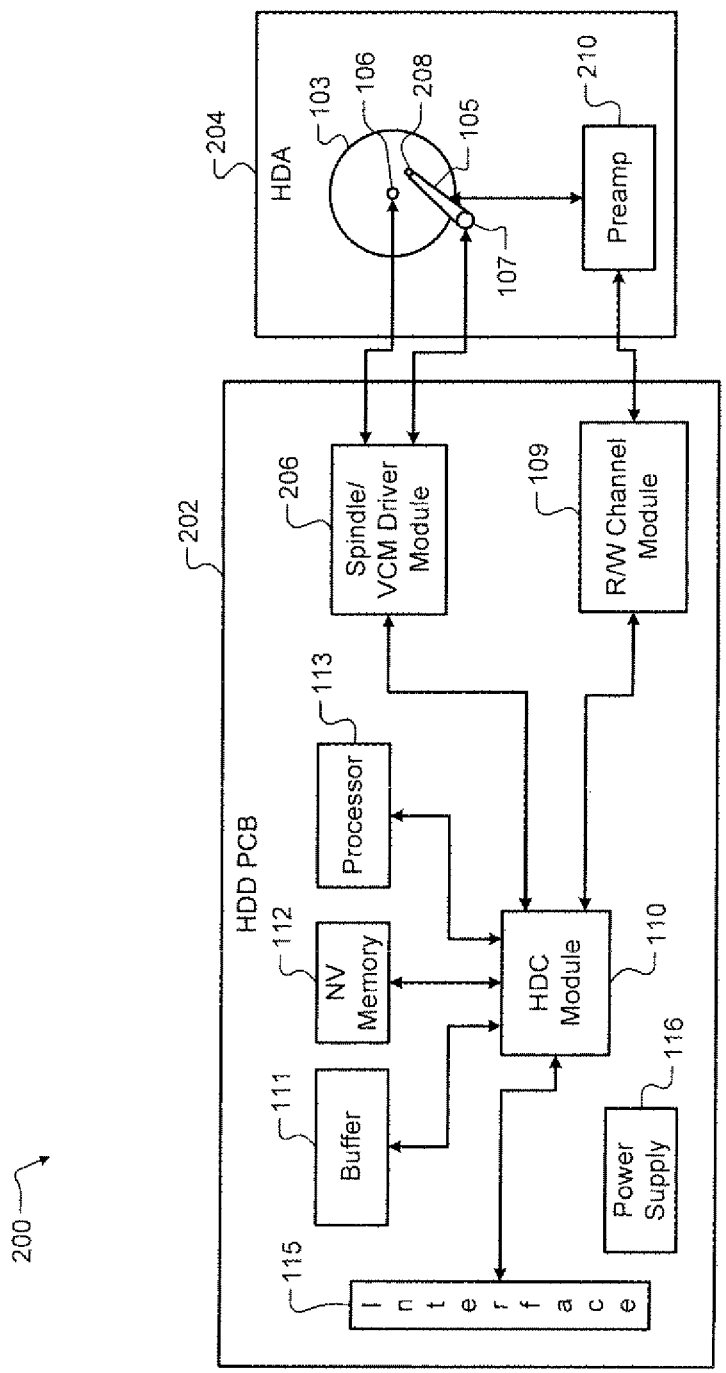
FIG. 2 is a an exemplary hard disk drive (HDD) including a hard drive assembly (HDA) that uses constant power circuits according to the principles of the present disclosure for flyheight control and/or magnetoresistive (MR) head biasing.

Referring now to FIG. 2, an exemplary hard disk drive (HDD) 200 that implements constant power circuits according to the principles of the present disclosure is depicted. The HDD 200 includes an HDD printed circuit board (PCB) 202 and a hard disk assembly (HDA) 204. The HDD PCB 202 may include a spindle/voice-coil motor (VCM) driver module 206 that controls flyheight of a read/write head 208 via the VCM 107. For example only, the spindle/VCM driver module 206 may supply a constant power single-ended signal to the VCM 107 to maintain a constant flyheight.

The HDA may include a preamplifying device 210 that biases a magnetoresistive (MR) element in the read/write head 208. For example only, the preamplifying device 210 may provide a constant power differential signal to the MR element. The preamplifying device 210 may generate the differential signal with approximately zero common-mode voltage to maximize the sensitivity of the MR element.

Figure 3:
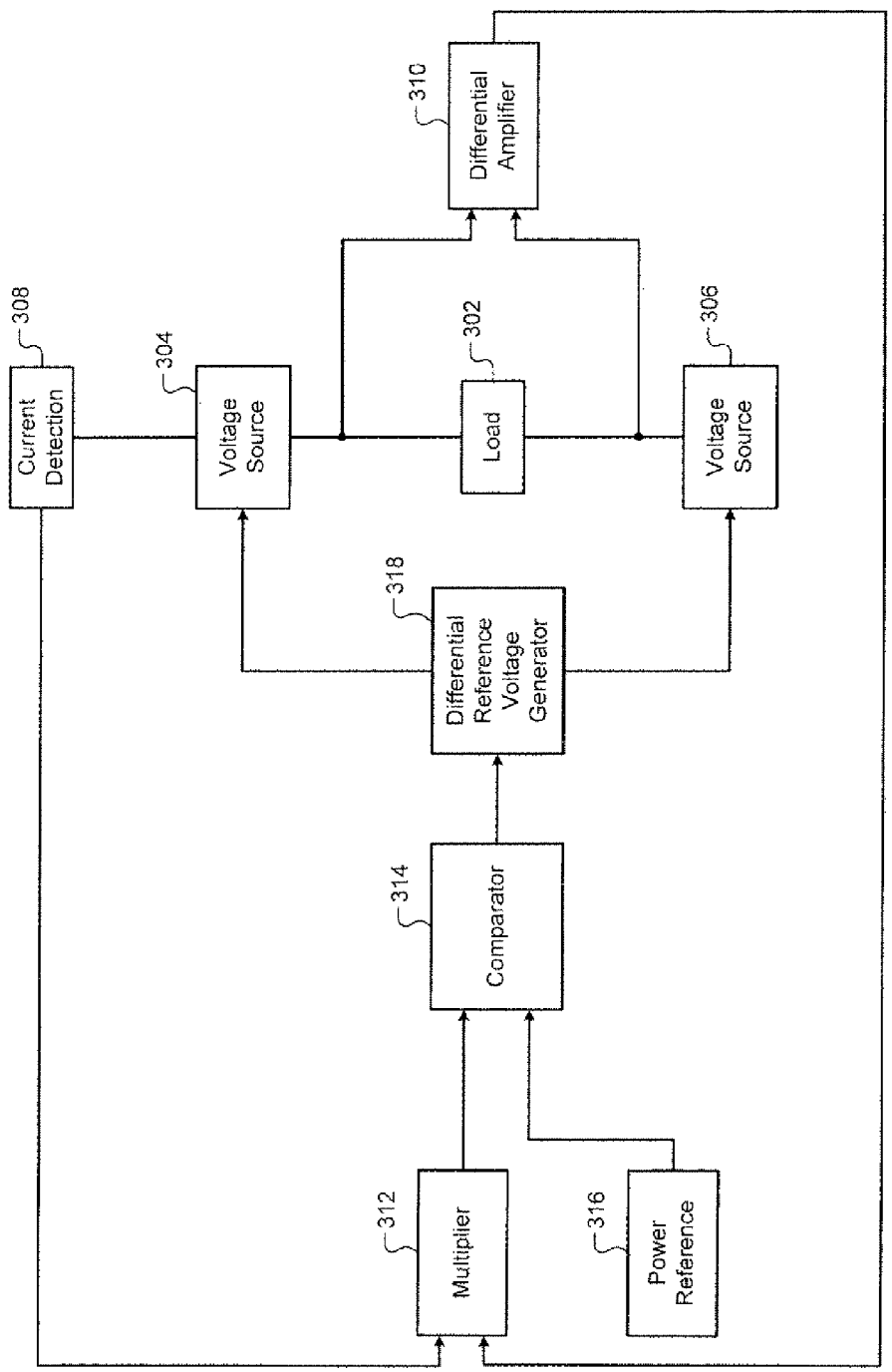
FIG. 3 is a functional block diagram of an exemplary differential constant power circuit according to the principles of the present disclosure.
Figure 3A:
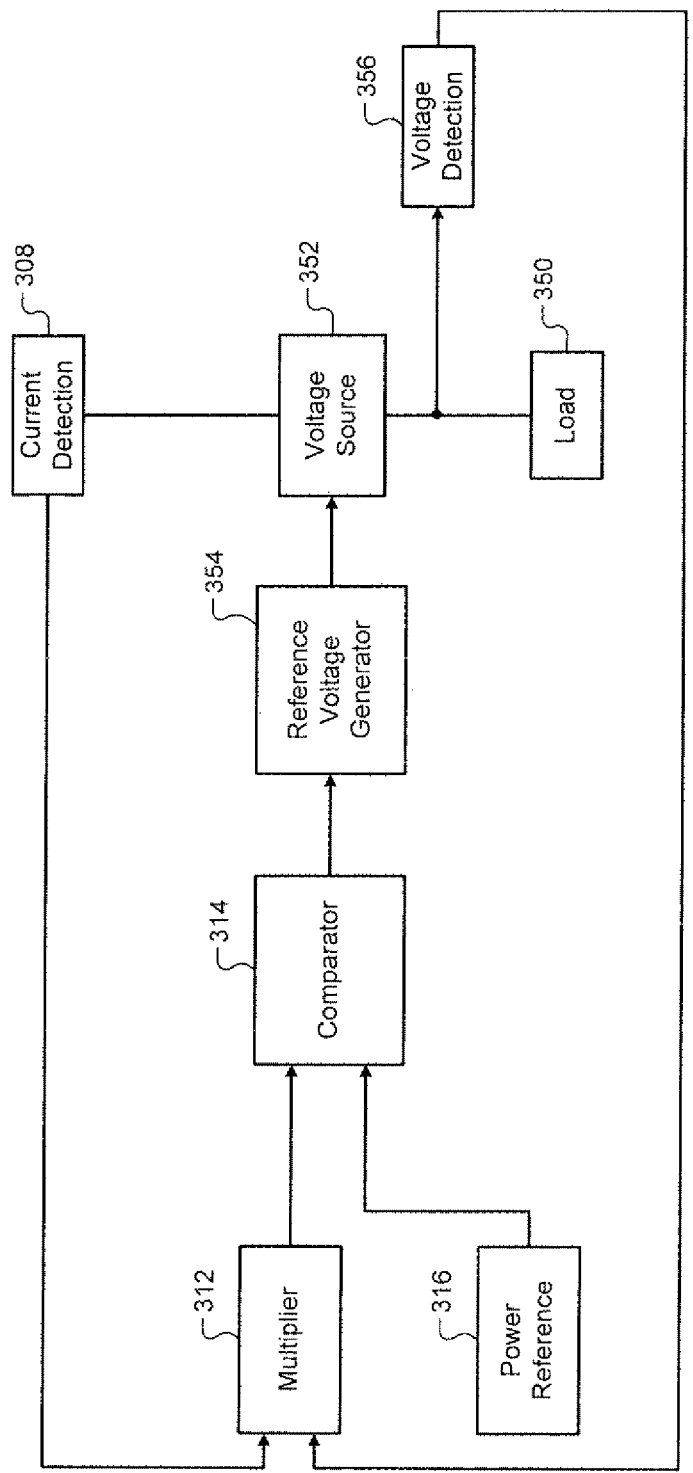
FIG. 3A is a single-ended implementation of a constant power circuit similar to that of FIG. 3.
Figure 4:
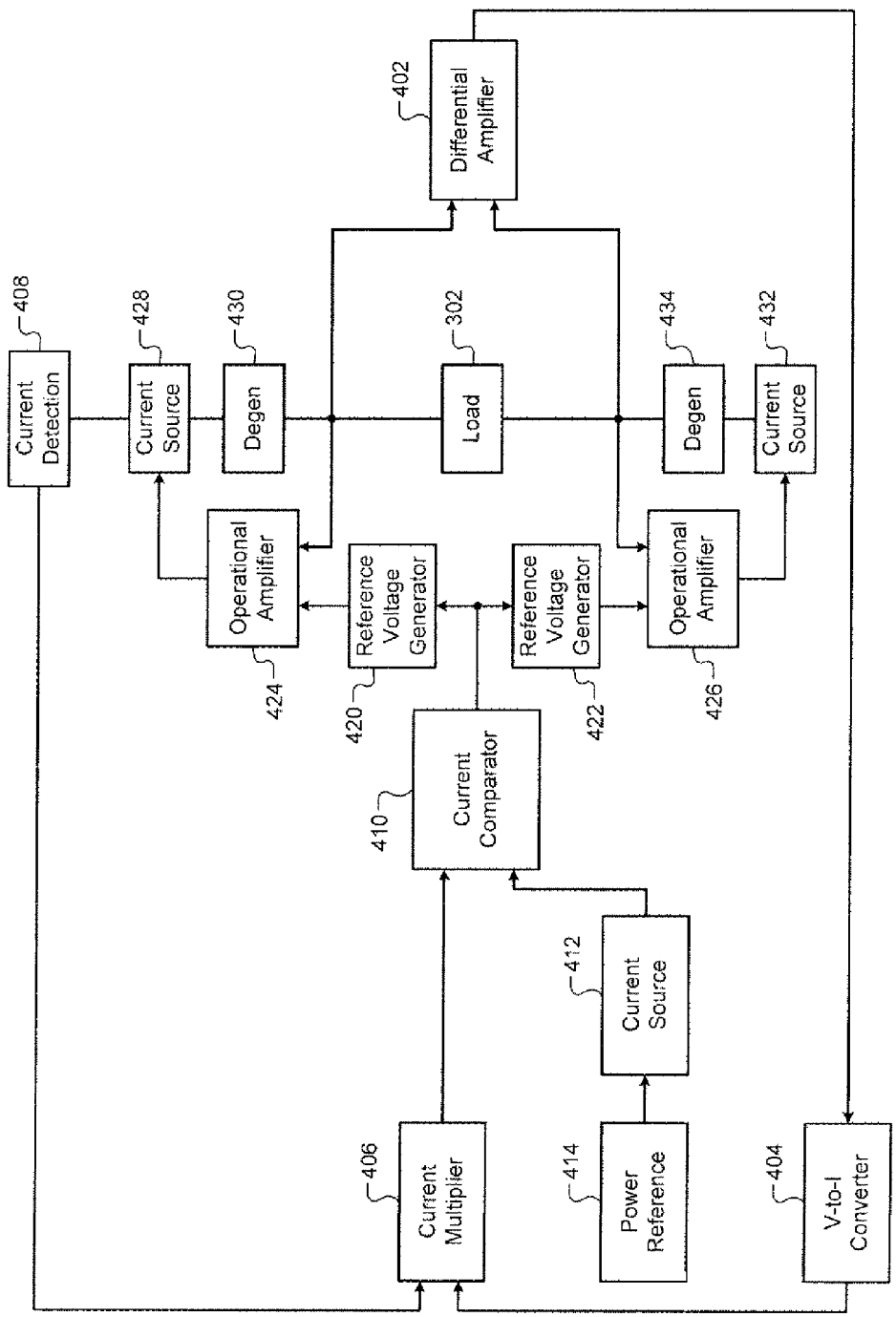
FIG. 4 is a more detailed functional block diagram of an exemplary implementation of the constant power circuit of FIG. 3.
Figure 5:
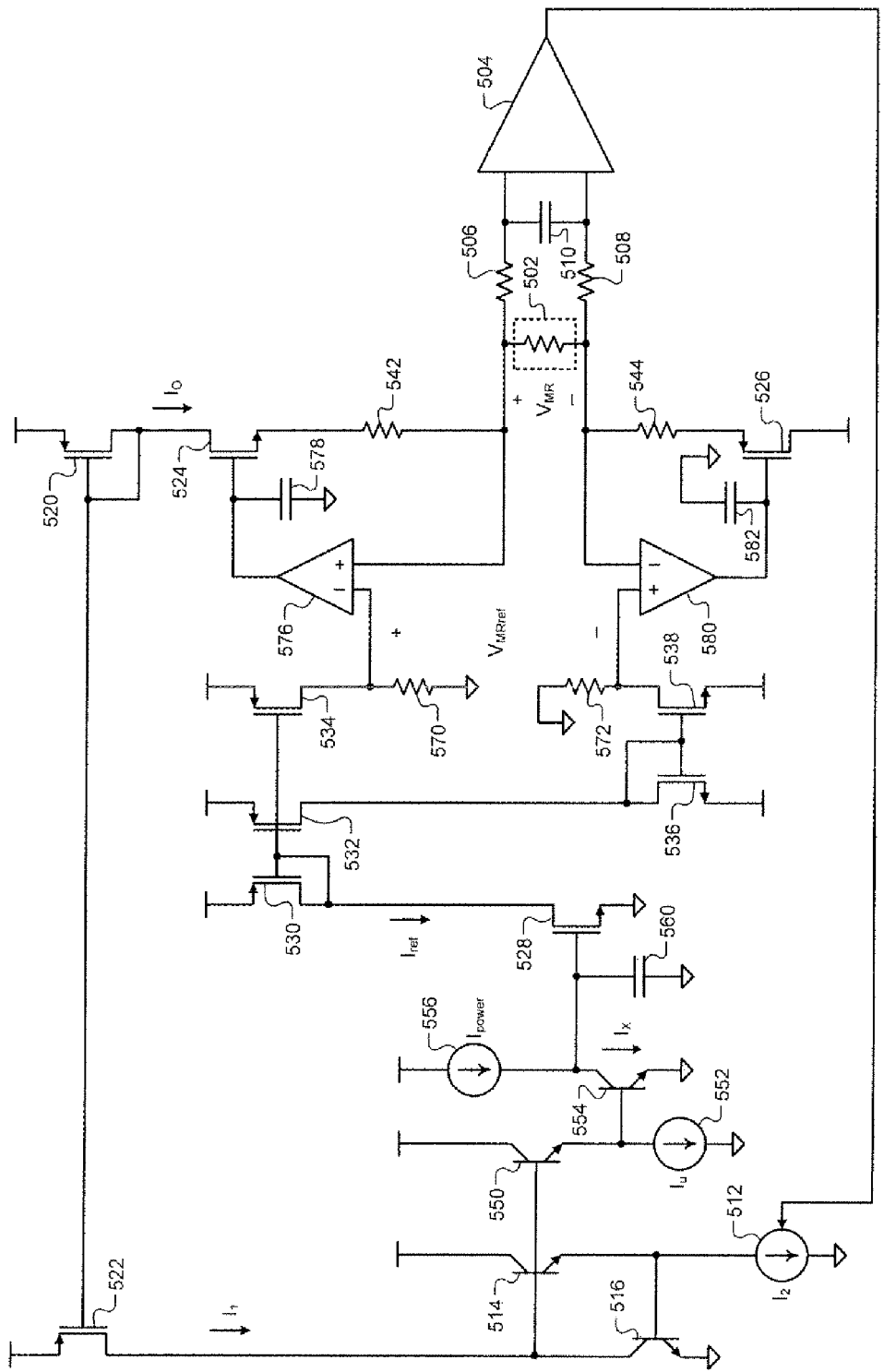
FIG. 5 is a functional schematic diagram of an exemplary implementation of the constant power circuit of FIG. 4 according to the principles of the present disclosure.

FIGS. 3-5 depict exemplary constant power circuits that use an analog feedback loop. FIGS. 3, 4, and 5 depict differential constant power circuits, while FIG. 3A depicts a single-ended constant power circuit. In FIGS. 3-5, a power reference signal is provided to the constant power circuits to establish the desired power to be delivered to the load. The power actually delivered to the load is determined by multiplying the current flowing through the load by the voltage across the load. An analog feedback loop adjusts the voltage across the load until the resulting power to the load is equal to the desired power.

Figure 6:
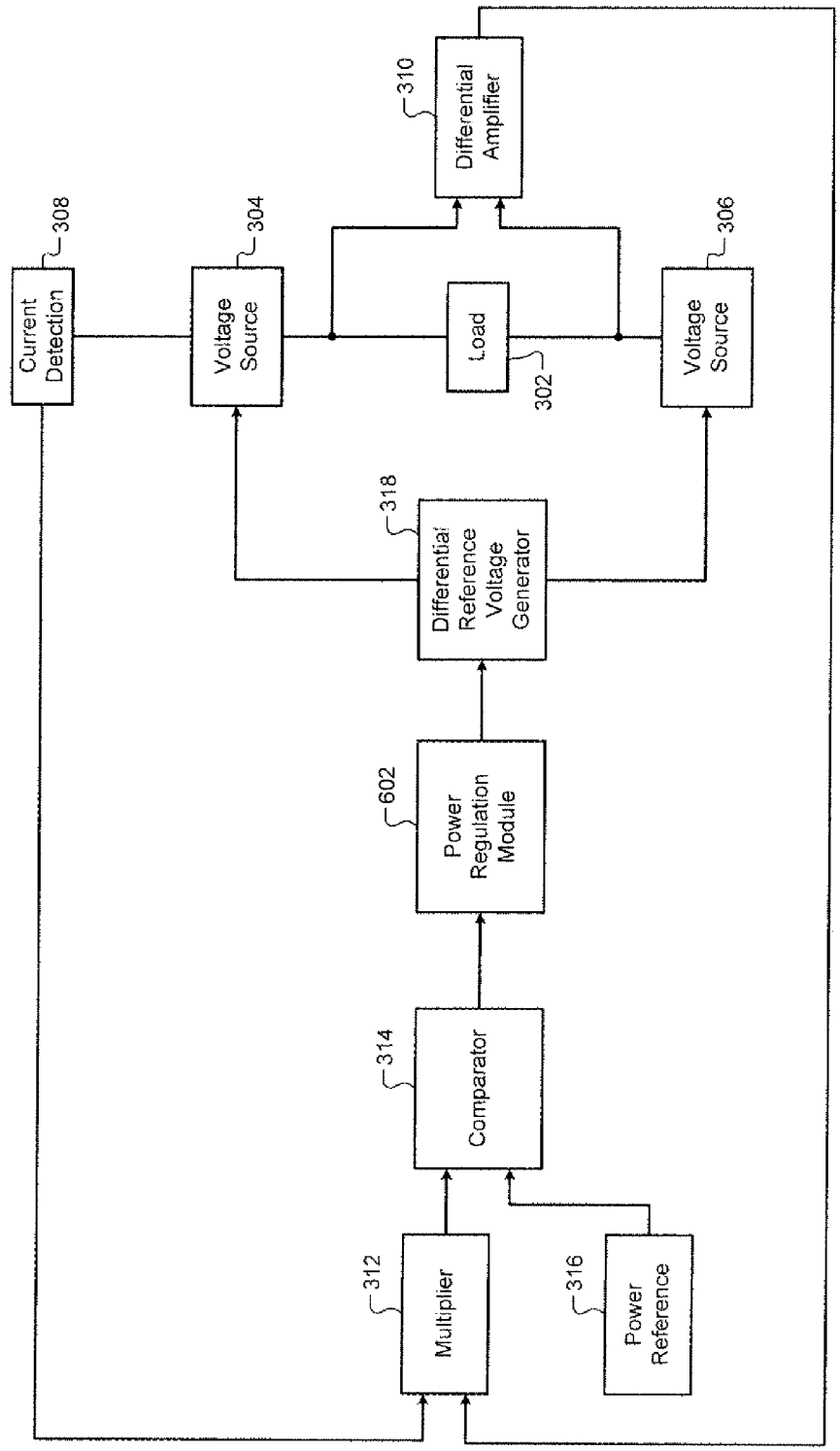
FIG. 6 is a functional block diagram of a constant power circuit similar to that of FIG. 3 but using a digital feedback loop according to the principles of the present disclosure.
Figure 7:
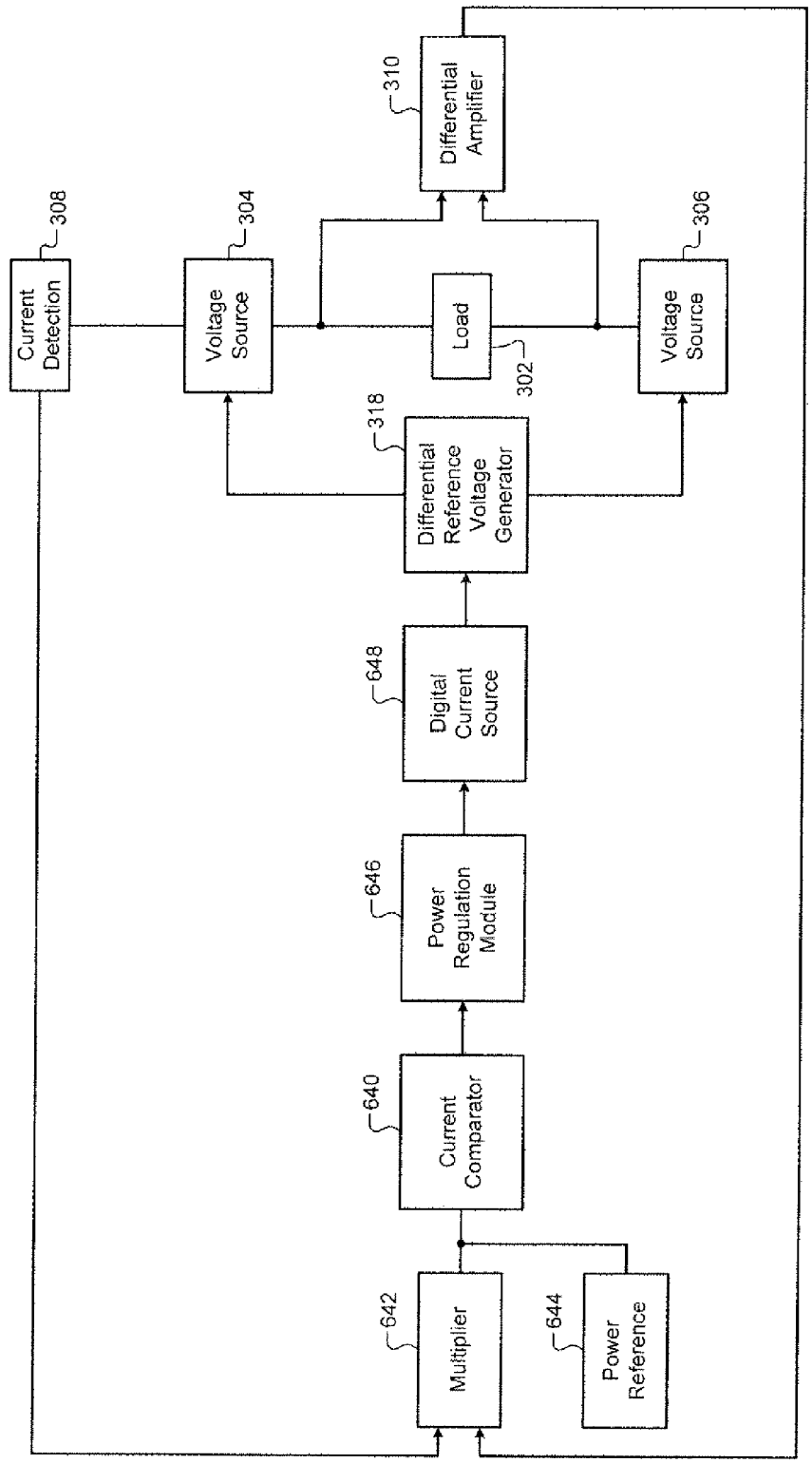
FIG. 7 is another exemplary implementation according to the principles of the present disclosure of a digitally-controlled constant power circuit similar to FIG. 6.
Figure 7A:
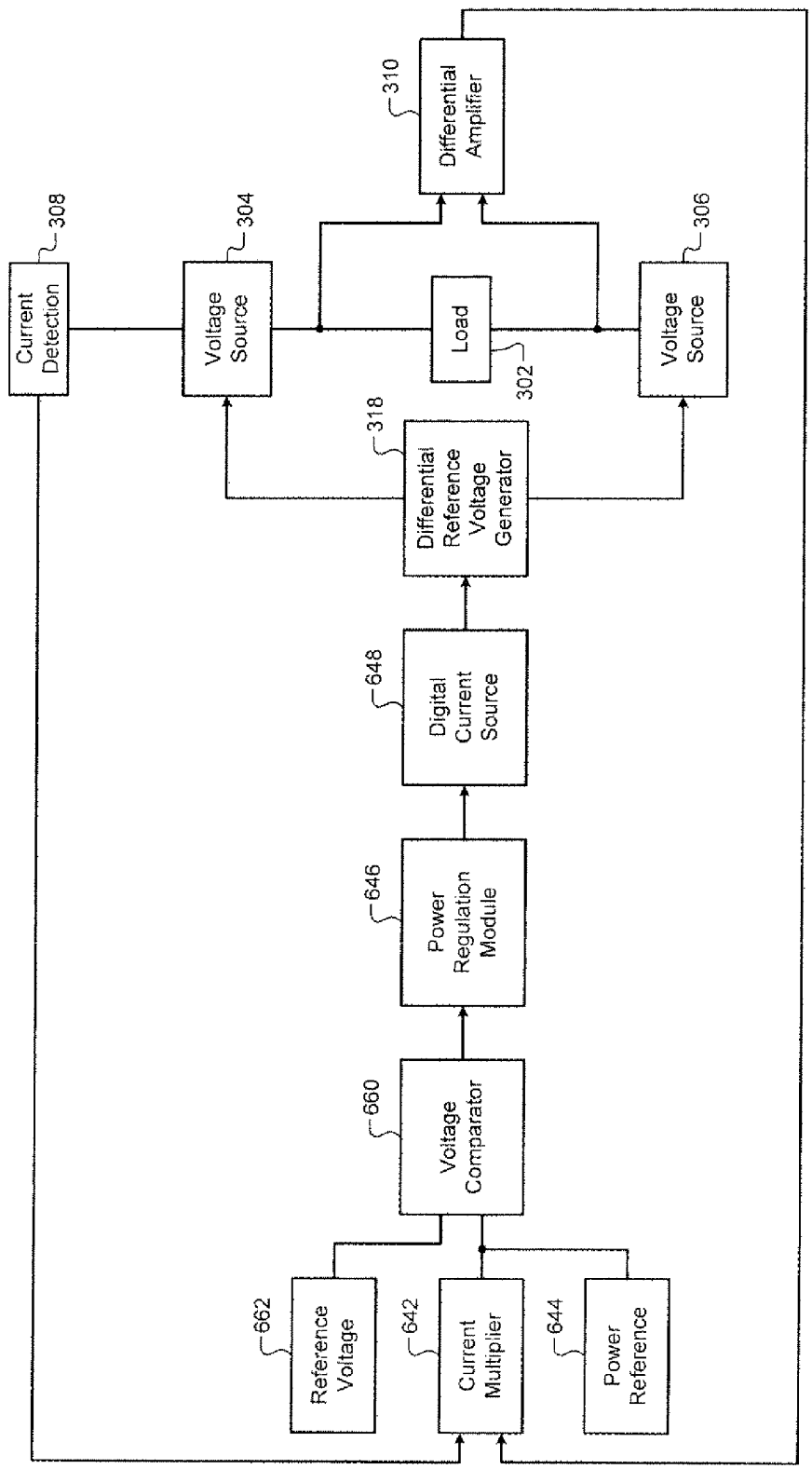
FIG. 7A is another exemplary implementation according to the principles of the present disclosure of a digitally-controlled constant power circuit similar to FIG. 7.

FIGS. 6-7A depict exemplary differential constant power circuits that use a digital feedback loop. These circuits may be similar to those of FIGS. 3-5 with the analog feedback loop replaced by a digital feedback loop.

FIGS. 8-10A depict exemplary constant power circuits using another implementation of a digital feedback loop. FIGS. 8, 8A, 9, 10, and 10A depict single-ended constant power circuits using this digital feedback loop, while FIG. 8B depicts a differential constant power circuit using this digital feedback loop. FIG. 11 depicts an exemplary digitally-controlled current minor as used in FIGS. 9-10A.

Referring now to FIG. 3, a functional block diagram of an exemplary differential constant power circuit is depicted. A load 302, such as a magnetoresistive (MR) head or giant MR head, receives power from an upper voltage source 304 and a lower voltage source 306. The current flowing through the voltage source 304, and therefore the load 302, is measured by a current detection module 308.

The current detection module 308 may also be located in other positions, such as between the load 302 and one of the voltage sources 304 and 306 or connected to the voltage source 306. In various implementations, the current detection module 308 may be implemented within one of the voltage sources 304 and 306.

The voltage across the load 302 is measured by a differential amplifier 310. A multiplier 312 multiplies the current measured by the current detection module 308 and the voltage measured by the differential amplifier 310. An output of the multiplier 312 is provided to a comparator 314. For example only, the comparator 314 may include a voltage comparator or a current comparator.

The comparator 314 also receives a signal from a power reference module 316. The comparator 314 outputs a signal based upon the difference between measured power as output by the multiplier 312 and the reference signal provided by the power reference module 316. For example only, the power reference module 316 may be programmatically controlled.

For example only, a digital value may be provided to the power reference module 316. The power reference module 316 then generates a current and/or voltage based on the digital value. This allows the amount of power delivered to the load 302 to be varied. A differential reference voltage generator 318 controls the voltage of the voltage sources 304 and 306.

The output of the comparator 314 may indicate that the power calculated by the multiplier 312 is less than the power signal from the power reference module 316. If so, the differential reference voltage generator 318 can increase the voltage differential between the voltage sources 304 and 306. For example only, the voltage sources 304 and 306 may be positive and negative, respectively, creating a common mode voltage of approximately zero volts.

In various implementations, a digital power regulation module (not shown) may be arranged between the comparator 314 and the differential reference voltage generator 318. The digital power regulation module digitally controls the differential reference voltage generator 318. Such a configuration is shown in more detail in FIG. 6.

Referring now to FIG. 3A, a single-ended implementation of a constant power circuit similar to that of FIG. 3 is depicted. A load 350 receives power from a voltage source 352. Current flowing into the load 350 is measured by the current detection module 308. The voltage source 352 is controlled by a reference voltage generator 354. The reference voltage generator 354 receives the output of the comparator 314.

The voltage produced by the voltage source 352 and received by the load 350 is detected by a voltage detection module 356. The multiplier 312 multiplies the outputs of the current detection module 308 and the voltage detection module 356. The load 350 may also be connected to a reference potential, such as ground. The voltage detection module 356 may measure the voltage at the load 350 with respect to that reference potential.

Referring now to FIG. 4, a more detailed functional block diagram depicts an exemplary implementation of the constant power circuit of FIG. 3. The voltage difference across the load 302 is detected by a differential amplifier 402. An output of the differential amplifier 402 may be a voltage, and may be converted to a current by a voltage-to-current converter 404. An output current from the voltage-to-current converter 404 is received by a current multiplier 406.

The current flowing through the load 302 is measured by a current detection module 408. An output current of the current detection module 408 is received by the current multiplier 406. The current multiplier 406 multiplies the currents received from the voltage-to-current converter 404 and the current detection module 408. The result of the multiplication is output to a current comparator 410. This multiplication result represents the power currently provided to the load 302.

The current comparator 410 compares the current from the current multiplier 406 with a current from a current source 412. The current source 412 is controlled by a power reference module 414. For example only, the current source 412 may be a digitally-controlled current source and may receive a digital value from the power reference module 414.

Alternatively, the power reference module 414 may output an analog voltage, which is converted to a current by the current source 412. An output of the current comparator 410 is received by first and second reference voltage generators 420 and 422. The output of the current comparator 410 may assume a range of voltages and/or currents based upon the difference between the currents from the current multiplier 406 and the current source 412.

For example only, when the output of the current multiplier 406 is lower than the output of the current source 412, the current comparator 410 may increase its output. As the disparity decreases, the current comparator 410 may lower its output. For example only, the current comparator 410 may output a reference voltage, such as zero volts, when the currents from the current multiplier 406 and the current source 412 are equal.

When the current from the current source 412 is greater, the current comparator 410 may output a voltage greater than the reference voltage. Similarly, when the current from the current source 412 is less than the current from the current multiplier 406, the current comparator 410 may output a voltage less than the reference voltage.

The reference voltage generators 420 and 422 generate single-ended voltages that are received by first and second operational amplifiers 424 and 426, respectively. The first and second operational amplifiers 424 and 426 also receive inputs from first and second ends of the load 302, respectively.

Each of the operational amplifiers 424 and 426 produce an output proportional to the difference between its inputs. Because the gain of the operational amplifiers 424 and 426 is large, the differential input voltage of each is generally forced to remain close to zero. An output of the operational amplifier 424 is received by a current source 428.

The current source 428 is connected to the first end of the load 302 by a degeneration resistance 430. When the voltage at the first end of the load 302 increases above the voltage received from the reference voltage generator 420, the operational amplifier 424 may decrease its output. This causes the current source 428 to decrease the current it produces, which then lowers the voltage at the first end of the load 302.

In this way, the voltage at the first end of the load 302 is maintained at the same voltage as the output of the first reference voltage generator 420. Similarly, an output of the second operational amplifier 426 is received by a current source 432, which is connected to the second end of the load 302 via a second degeneration resistance 434. The voltage at the second end of the load 302 is therefore maintained at the same voltage as the output of the second reference voltage generator 422.

In summary, the constant power circuit of FIG. 4 operates by measuring the current through the load 302 and the voltage across the load 302. The product of the load voltage and current is compared to a reference power. Finally, a differential voltage is produced across the load 302 based on that comparison.

Referring now to FIG. 5, a functional schematic diagram depicts an exemplary implementation of the constant power circuit of FIG. 4. The load 302 is represented in FIG. 5 as load resistance 502. For example only, the load resistance 502 may be a magnetoresistive (MR) head or giant MR head. A voltage $V_{MR}$ is defined between first and second ends of the load resistance 502.

The first end of the load resistance 502 is connected to a first input of a differential amplifier 504 via a first resistance 506. The second end of the load resistance 502 is connected to a second input of the differential amplifier 504 via a second resistance 508. A capacitor 510 is connected across the first and second inputs of the differential amplifier 504.

An output of the differential amplifier 504 controls a current source 512. Current $I_2$ is produced by the current source 512 and may be proportional to the voltage from the differential amplifier 504. The current source 512 may be connected to a ground potential. An output of the current source 512 is connected to a first bipolar junction transistor (BJT) 514, which has a base, a collector, and an emitter.

The emitter of the first BJT 514 is connected to the output of the current source 512. A base of a second BJT 51.6 is connected to the emitter of the first BJT 514. The collector of the second BJT 516 is connected to the base of the first BJT 514. The collector of the first BJT 514 is connected to a positive supply potential. The emitter of the second BJT 51.6 is connected to a reference potential, such as ground.

The constant power circuit of FIG. 5 includes first, second, third, fourth, fifth, sixth, seventh, eighth, ninth, and tenth transistors 520, 522, 524, 526, 528, 530, 532, 534, 536, and 538. These transistors may be metal-oxide-semiconductor field-effect transistors (MOSFETs) that each has a gate, a source, and a drain.

For example only, the transistors 520, 522, 526, 530, 532, and 534 may be P-channel MOSFETs, while the transistors 524, 528, 536, and 538 may be N-channel MOSFETs. The first end of the first load resistance 502 is connected to the source of the transistor 524 through a resistance 542. The second end of the load resistance 502 is connected to the source of the transistor 526 via a resistance 544.

The drain of the transistor 524 is connected to the drain of the transistor 520. The sources of the transistors 520 and 522 are connected to a positive supply potential. The gates of the transistors 520 and 522 are connected to each other and to the drain of the transistor 520, creating a current mirror. The current flowing through the load resistance 502, denoted $I_O$, is therefore reproduced through the transistor 522.

Current $I_1$, flowing through the transistor 522, is proportional to the current $I_O$ based upon the width-to-length ratios of the transistors 520 and 522. In various implementations, the current mirror composed of the transistors 520 and 522 may be replaced by any other suitable current mirror, such as one having a greater output resistance.

The current $I_1$ from the transistor 522 flows into the base of the first BJT 514 and the collector of the second BJT 516. The current $I_1$ also flows into the base of a third BJT 550, whose base is connected to the base of the first BJT 514. The collector of the third BJT 550 is connected to the positive supply potential, while the emitter of the third BJT 550 is connected to a current source 552 and the base of a fourth BJT 554.

The current source 552 produces a predetermined current, and may be connected to the ground potential. For example only, the current source 552 may produce $I_u$ based on a bandgap reference circuit. The current source 552 may produce $I_u$ to be independent of temperature. Alternatively, the current source 552 may produce $I_u$ to be dependent on temperature to offset other temperature dependencies in the constant power circuit.

The collector of the fourth BJT 554 is connected to a current source 556, and the emitter of the fourth BJT 554 may be connected to the ground potential. The current source 556 produces a current, $I_{power}$, that determines the power to be delivered to the load resistance 502. In various implementations, the current source 556 may be digitally-controlled or may be controlled based on the output of a digital-to-analog converter (DAC).

Current $I_x$ flows into the collector of the fourth BJT 554. The BJTs 514, 516, 550, and 554 form an analog multiplier. The current $I_x$ is equal to the product of $I_1$ and $I_2$ divided by $I_u$. The current $I_1$ is proportional to the current flowing through the load resistance 502, the current $I_2$ is proportional to the voltage across the load resistance 502, and the current is a constant. The current $I_x$ is therefore equal to the power delivered to the load resistance 502 scaled by a constant value.

The collector of the fourth BJT 554 is a high impedance node, which increases in voltage when is less than $I_{power}$ and decreases in voltage when $I_x$ is greater than $I_{power}$. A capacitor 560 limits the rate of change of this high impedance node. The voltage at his high impedance node is connected to the gate of the transistor 528, which amplifies this voltage to create a current $I_{ref}$. The source of the transistor 528 may be connected to the ground potential.

The current $I_{ref}$ therefore reflects the difference between the programmed power represented by the current $I_{power}$ and the measured power represented by the current $I_x$. The current $I_{ref}$ is then used to create equal and opposite voltages across the load resistance 502. To this end, the drains of the transistors 528 and 530 are connected to each other and to the gate of the transistor 530.

The current $I_{ref}$ will therefore also flow through the transistor 530. The gate of the transistor 530 is connected to the gates of the transistors 532 and 534, creating two current mirrors. The sources of the transistors 530, 532, and 534 are connected to the positive supply potential. A resistance 570 is connected between the drain of the transistor 534 and ground.

The voltage at the drain of the transistor 534 is equal to the current through the transistor 534 (which is proportional to $I_{ref}$) multiplied by the resistance value of the resistance 570. Similarly, the current flowing through the transistor 532 is mirrored through the transistors 536 and 538 to a resistance 572. To create this current mirror, the gates of the transistors 536 and 538 are connected to each other and to the drains of the transistors 536 and 532. The sources of the transistors 536 and 538 are connected to a negative supply potential.

The resistance 572 is connected between the ground potential and the drain of the transistor 538. The voltage at the drain of the transistor 538 is therefore equal to a current proportional to $I^{ref}$ multiplied by a constant equal to the resistance value of the resistance 572. The voltage formed between the drains of the transistors 534 and 538 is a differential reference voltage, $V_{MRref}$. A first operational amplifier 576 receives the voltage of the drain of the transistor 534 at its inverting input and the voltage at the first end of the load resistance 502 at its non-inverting input.

An output of the first operational amplifier 576 is connected to the gate of the transistor 524. A capacitor 578 is connected between the gate of the transistor 524 and a reference potential, such as ground, to control the rate of change of the voltage at the gate of the transistor 524. The first operational amplifier 576 keeps the voltage at the first end of the load resistance 502 approximately equal to the voltage at the drain of the transistor 534.

When the voltage at the first end of the load resistance 502 increases, the output of the first operational amplifier 576 increases, increasing the gate voltage of the transistor 524. The current through the transistor 524 therefore increases, which increases the voltage drop across the resistance 542. This lowers the voltage at the first end of the load resistance 502, thereby keeping the first end of the load resistance 502 approximately fixed to the voltage at the drain of the transistor 534.

Similarly, a second operational amplifier 580 receives the voltage of the drain of the transistor 538 at its non-inverting input and the voltage of the second end of the load resistance 502 at its inverting input. An output of the second operational amplifier 580 is connected to the gate of the transistor 526. A capacitor 582 is connected between the gate of the transistor 526 and a reference potential, such as ground, to limit the rate of voltage change. The second operational amplifier 580 holds the voltages of the second end of the load resistance 502 and the drain of the transistor 538 approximately equal.

Referring now to FIG. 6, a functional block diagram depicts a constant power circuit that is similar to that of FIG. 3 but uses a digital feedback loop. A power regulation module 602 receives the output of the comparator 314 and controls the differential reference voltage generator 318. In various implementations, the differential reference voltage generator 318 may be implemented as part of the power regulation module 602.

The power regulation module 602 may control the voltage produced by the differential reference voltage generator 318 by sending a digital control signal to the differential reference voltage generator 318. The differential reference voltage generator 318 can then convert the control signal into an analog voltage for the voltage sources 304 and 306.

The power regulation module 602 may increase the control signal until the comparator 314 signals that the output of the multiplier 312 (measured power) has reached the output of the power reference module 316 (desired power). An iterative process using small steps (such as one LSB of the control signal) ensures that the power delivered to the load 302 will not exceed the desired power.

Once the comparator 314 signals that the measured power is greater than the desired power, the power regulation module 602 can decrease the control signal by one LSB. The comparator 314 should now signal that the measured power is less than the power from the desired power.

If the control signal is fixed at this point, however, there will be no indication if the measured power becomes much less than the desired power. This is because the comparator 314 only indicates that the measured power is less than the desired power. The power to the load 302 may drop to zero without any indication to the power regulation module 602.

The power regulation module 602 may therefore dither the control signal by one LSB. When the power regulation module 602 increases the control signal by one LSB, the measured power should be greater than the desired power. The power regulation module 602 can then decrease the control signal by one LSB. At this point, the measured power should once again be below the desired power.

The control signal may be dithered at a rate that is slower than the rate of change used when initially incrementing the control signal to reach the desired power. By fluctuating within one LSB, the power regulation module 602 can periodically check that the measured power is not varying from the desired power. This is useful because the load 302 may vary from the desired power even with a constant input from the power regulation module 602. For example, the measured power may vary based on impedance changes within the load 302 and/or temperature or environment changes that affect the differential reference voltage generator 318 and/or the voltage sources 304 and 306.

If the load 302 can withstand greater power delivery, at least for a limited amount of time, the power regulation module 602 may use other control strategies to initially reach the desired power. For example, the power regulation module 602 may perform a binary search, where each bit of the control signal, from the most significant bit (MSB) to the least significant bit (LSB), is toggled. If, when a bit is set to one, the comparator 314 indicates that the measured power is now greater than the desired power, the bit is reset to zero and the next-least significant bit is set to one.

A binary search is fast but may produce large overshoots in power delivered to the load 302. Another approach is to increment the control signal in steps greater than a single LSB. Once the comparator 314 indicates that the measured power has exceeded the desired power, the power regulation module 602 may reverse the last voltage increase. The power regulation module 602 can then increase the control signal using the smallest possible step.

Alternatively, once the power from the multiplier 312 exceeds the power reference module 316, the power regulation module 602 may decrement the control signal one LSB at a time. The control signal can be decremented until the comparator 314 indicates that the measured power is less than the desired power.

For example only, the power regulation module 602 may increment the third-least-significant bit of the control signal. This is equivalent to increasing the control signal four LSBs at a time. The desired power is therefore reached approximately four times as fast, while temporary overshoot of power delivery to the load 302 is limited to four LSBs.

Turning now to the times when the power reference module 316 is directed to change the desired power, the power regulation module 602 may not be aware of these directions. Instead, the power regulation module 602 may observe that dithering the LSB of the control signal does not change the output of the comparator 314. The power regulation module 602 may attempt to change the output of the comparator 314 by incrementing or decrementing the control signal one LSB at a time.

If the output of the comparator 314 does not change after multiple LSB increments, a sharp change in either the measured power or the desired power has occurred. Changes in measured power will likely be gradual (such as changes in resistance of the load 302 with temperature), and can likely be tracked one or two LSBs at a time. A sharp change is therefore more likely to occur in the desired power.

If the measured power is less than the desired power, the power regulation module 602 may begin a new programming procedure to reach the desired power. For example, the power regulation module 602 may increment the control signal by multiple LSBs at a time until the desired power is reached. Alternatively, the control signal may be restarted from zero.

If the measured power is greater than the desired power after decreasing the control signal by multiple LSBs, the power regulation module 602 may immediately decrease the control signal to zero. This prevents excessive power from being delivered to the load 302. Alternatively, the power regulation module 602 may decrease the control signal by multiple LSBs at a time until the desired power is reached.

Figure 6A:
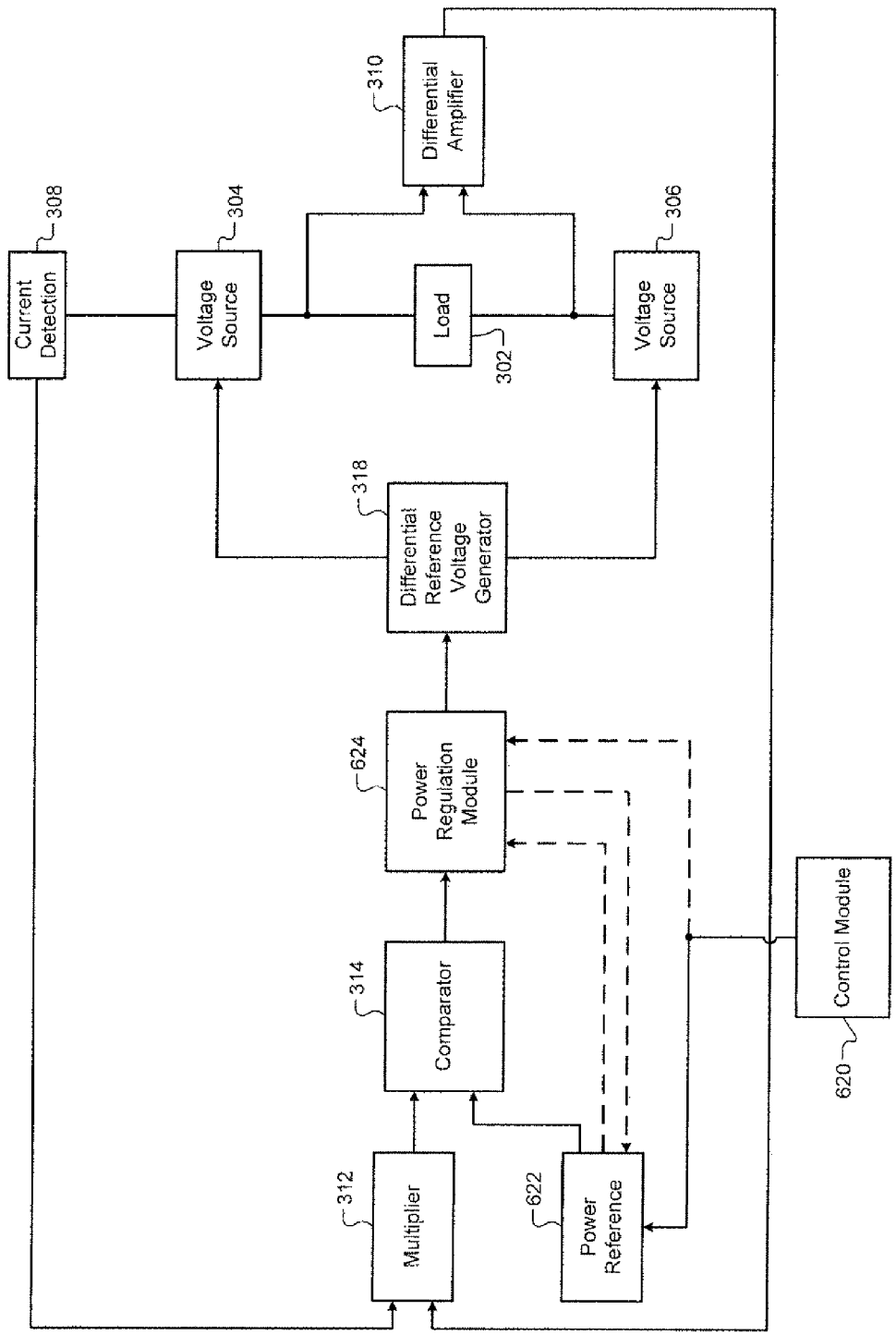
FIG. 6A is a functional block diagram of an exemplary implementation of the constant power circuit of FIG. 6 incorporating external control according to the principles of the present disclosure.

Referring now to FIG. 6A, a functional block diagram of an exemplary implementation of the constant power circuit of FIG. 6 incorporating external control is presented. A control module 620 provides a signal to a power reference module 622. The control module 620 may be part of a hard drive control module, such as the HDC module 110 of FIG. 2.

To change the power to the load 302, the control module 620 can send a new value to the power reference module 622. The power reference module 622 produces a voltage and/or a current based on the signal from the control module 620. For example only, the signal from the control module 620 may be a digital value, which the power reference module 622 converts to a voltage or a current using a DAC.

A power regulation module 624 receives the output of the comparator 314 and controls the differential reference voltage generator 318 accordingly with a control signal. The power reference module 622 may signal to the power regulation module 624 when a new power value has been received. Alternatively, the power regulation module 624 may receive the new power value directly from the control module 620. When a new power value has been received, the power regulation module 624 can immediately work to achieve the new desired power.

For example, the power regulation module 624 may immediately decrease the control signal to zero. This prevents more power from being delivered to the load 302 than is desired. In various implementations, the power regulation module 624 may only return the control signal to zero when the power reference module 622 indicates that the desired power has decreased.

The power regulation module 624 can then begin programming the power delivered to the load 302 to the desired value. For example, the power regulation module 624 may increment the control signal by multiple LSBs until the desired power is reached, at which point the control signal can be finely tuned with single LSB changes. Alternatively, the power regulation module 624 may use another control strategy, as described above, such as a binary search.

Instead of returning the control signal to zero when the power regulation module 624 receives a signal that the reference power has changed, the power regulation module 624 may begin from the current control signal. For example, the power regulation module 624 may increase or decrease the control signal in increments of four LSBs until the output of the comparator 314 reverses. The control signal can then be finely tuned with single LSB changes.

If no power overshoot is allowed to the load 302, improved programming speed can still be achieved. After the power reference module 622 receives a new power value, the power regulation module 624 may instruct the power reference module 622 to temporarily decrease its output from the new power value. The power regulation module 624 can then increment the control signal by larger steps, such as four LSBs at a time.

Once the output of the comparator 314 reverses, the measured power has reached the temporarily-reduced desired power. The power regulation module 624 can then instruct the power reference module 622 to return to the desired power value. The power regulation module 624 can then increment the control signal by single LSBs until the measured power reaches the new desired power.

Referring now to FIG. 7, another exemplary implementation of a digitally-controlled constant power circuit similar to FIG. 6 is depicted. An input of a current comparator 640 is connected to outputs of a current multiplier 642 and a power reference module 644. The current multiplier 642 produces an output current based upon multiplication of a current from the current detection module 308 and a current from the differential amplifier 310.

The power reference module 644 produces a reference current based on the desired power to be delivered to the load 302. The current comparator 640 senses whether the current from the current multiplier 642 is greater than that from the power reference module 644. The current comparator 640 outputs a signal indicating which of the currents is greater.

The output of the current comparator 640 is received by a power regulation module 646. The power regulation module 646 may be similar to the power regulation module 602 of FIG. 6, except that the power regulation module 646 outputs a digital value to a digital current source 648. The digital current source 648 converts that digital value into a current that is provided to the differential reference voltage generator 318. The differential reference voltage generator 318 then produces reference voltages based upon the current from the digital current source 648.

Referring now to FIG. 7A, another exemplary implementation of a digitally-controlled constant power circuit similar to FIG. 7 is depicted. The current comparator 640 of FIG. 7 is replaced by a voltage comparator 660. A first input of voltage comparator 660 receives a reference voltage from a reference voltage module 662. The reference voltage module 662 produces a predetermined voltage that is compared to a second input of the voltage comparator 660.

The second input of the voltage comparator 660 is connected to the output of the current multiplier 642 and to the output of the power reference module 644. The second input of the voltage comparator 660 is a high impedance node whose voltage is compared to the reference voltage from the reference voltage module 662. For example only, when the current multiplier 642 is producing a greater current than the power reference module 644, the high impedance node will be pulled high, and vice versa.

The reference voltage provided to the voltage comparator 660 may correspond to the voltage at the high impedance node when the currents from the current multiplier 642 and the power reference module 644 are equal. Therefore, when the voltage at the high impedance node is higher than the reference voltage, the voltage comparator 660 signals that one of the currents is greater, and vice versa. For example only, when the voltage at the high impedance node is higher than the reference voltage, the current from the power reference module 644 may be greater. The output of the voltage comparator 660 is used by the power regulation module 646 to control the digital current source 648.

Figure 8:
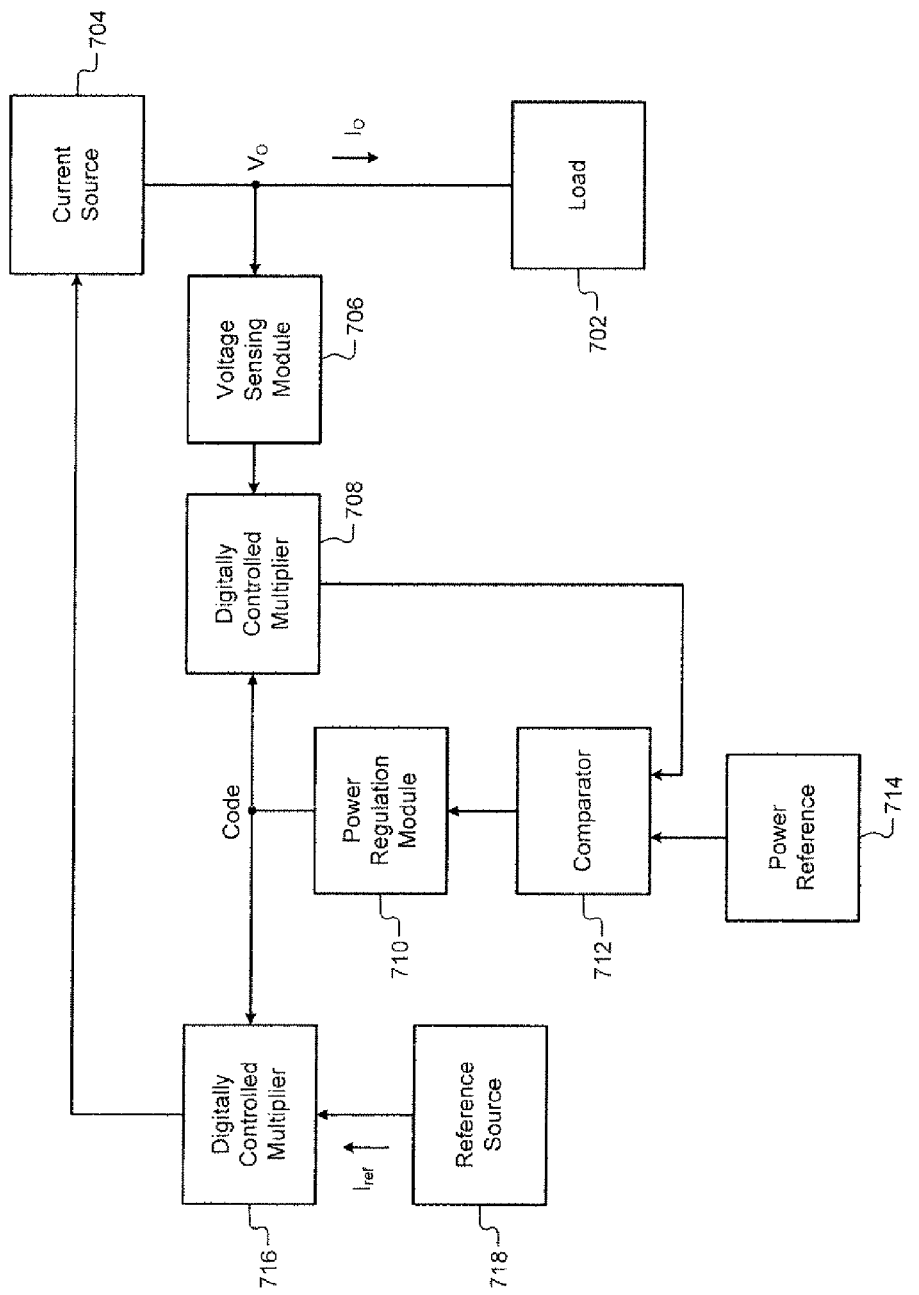
FIG. 8 is a functional block diagram of another exemplary digitally-controlled constant power circuit according to the principles of the present disclosure.

Referring now to FIG. 8, a functional block diagram of another exemplary digitally-controlled constant power circuit is presented. The implementation shown in FIG. 8 is single-ended, while a differential implementation is shown in FIG. 8B. A load 702, which may be grounded, receives current from a current source 704.

A voltage sensing module 706 detects the voltage at the load 702. A digitally-controlled multiplier 708 multiplies an output of the voltage sensing module 706 by a digitally-controlled value. The digitally-controlled value is determined by a digital code provided by a power regulation module 710. The power regulation module 710 also provides the code to a second digitally-controlled multiplier 716.

An output of the digitally-controlled multiplier 708 is provided to a comparator 712. A second input of the comparator 712 receives a signal from a power reference module 714. The inputs to the comparator 712 may be analog currents, analog voltages, or digital values. An output of the comparator 712 is provided to the power regulation module 710.

The second digitally-controlled multiplier 716 multiplies a signal received from a reference source 718 by a scalar dictated by the code from the power regulation module 710. The output of the second digitally-controlled multiplier 716 is provided to the current source 704, which applies the specified current to the load 702.

The reference source 718 may be a temperature-stable source or may compensate for temperature changes in other parts of the constant power circuit. For example only, the reference source 718 may include a bandgap reference circuit. The current flowing through the load 702 is equal to the product of the current from the reference source 718 and the digital value received from the power regulation module 710.

The power at the load 702 is equal to its current, $I_O$, times its voltage, $V_O$. The current $I_O$ flowing through the load 702 is proportional (with constant K) to the current $I_{ref}$ from the reference source 718 times a value based on the code, $K_{code}$. The power at the load 702 is therefore equal to $V_O \cdot K \cdot I_{ref} \cdot K_{code}$. The current at the first input of the comparator 712 is equal to $V_O \cdot K_{code}$. The current at the first input of the comparator 712 is equal to the power at the load 702 scaled by a constant, $K \cdot I_{ref}$. The power reference module 714 provides a scaled version of the desired power to the second input of the comparator 712.

The power regulation module 710 can increase the code when the comparator 712 indicates that the measured power from the digitally-controlled multiplier 708 is less than the desired power from the power reference module 714. Likewise, the power regulation module 710 can decrease code when the measured power is greater than the desired power.

Figure 8A:
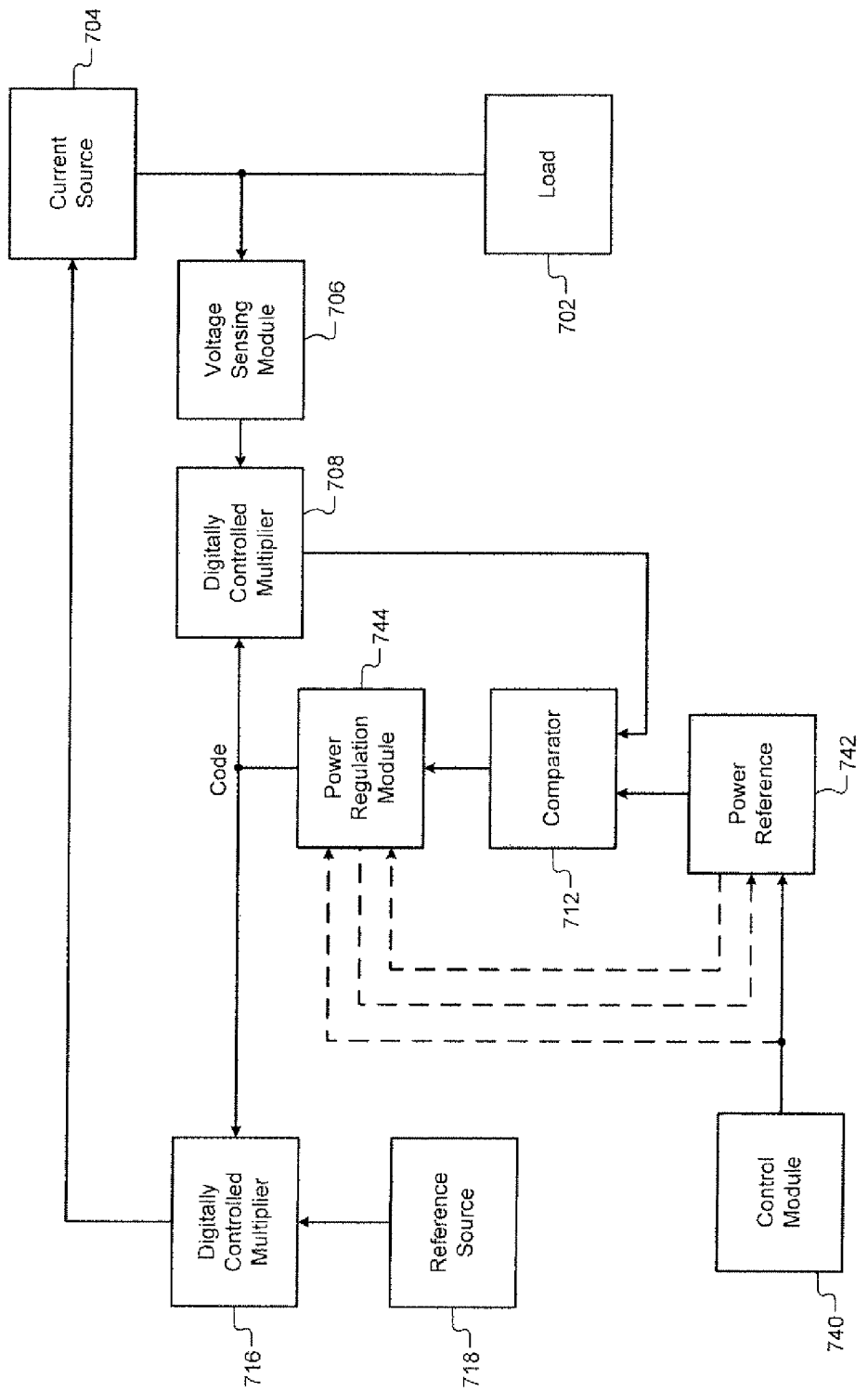
FIG. 8A is a functional block diagram of an exemplary constant power circuit similar to that of FIG. 8 incorporating external control according to the principles of the present disclosure.
Figure 8B:
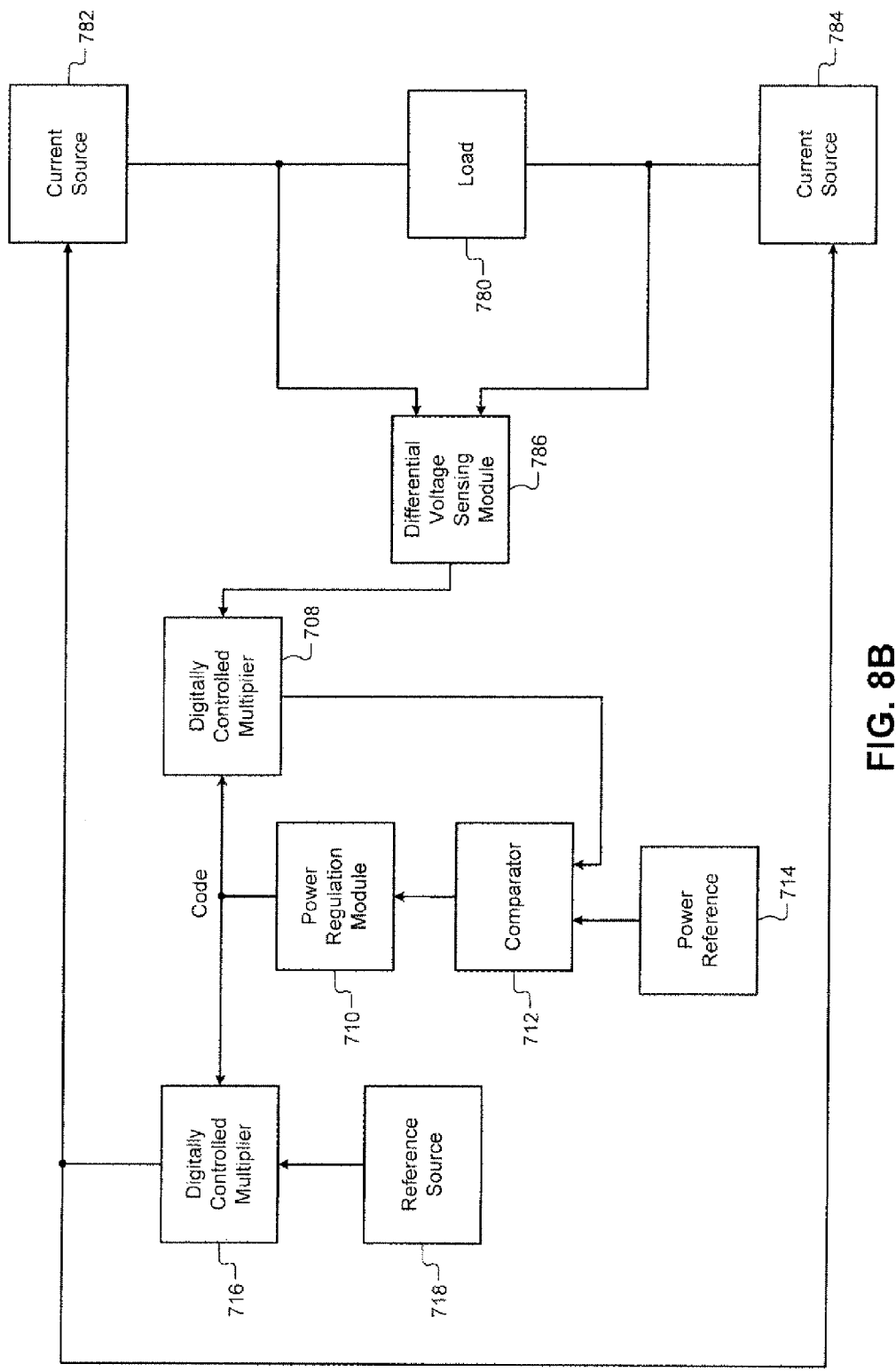
FIG. 8B is a functional block diagram of an exemplary differential implementation according to the principles of the present disclosure of a constant power circuit similar to that of FIG. 8.

Referring now to FIG. 8A, a functional block diagram of an exemplary constant power circuit similar to that of FIG. 8 incorporating external control is presented. A control module 740 instructs a power reference module 742 to produce a signal, such as a voltage or current, representing a desired power to apply to the load 702. Similarly to FIG. 6A, the control module 740 may also send the new desired power value to a power regulation module 744.

The power regulation module 744 can then control its digital value more accurately, knowing when a new reference power will be provided by the power reference module 742. The power reference module 742 may communicate a signal to the power regulation module 744 indicating that a new reference power has been instructed. In addition, the power regulation module 744 may send a signal to the power reference module 742 instructing the power reference module 742 to temporarily reduce the generated reference signal.

Referring now to FIG. 8B, a functional block diagram depicts an exemplary differential implementation of a constant power circuit similar to that of FIG. 8. A load 780 is biased by first and second current sources 782 and 784. A differential voltage sensing module 786 detects the voltage across the load 780. The first and second current sources 782 and 784 receive the output of the second digitally-controlled multiplier 716.

The first and second current sources 782 and 784 produce equal currents, and may establish a common mode voltage of approximately zero volts for the load 780. A differential voltage sensing module 786 measures the differential voltage across the load 780 and provides this measured value to the digitally-controlled multiplier 708.

Figure 9:
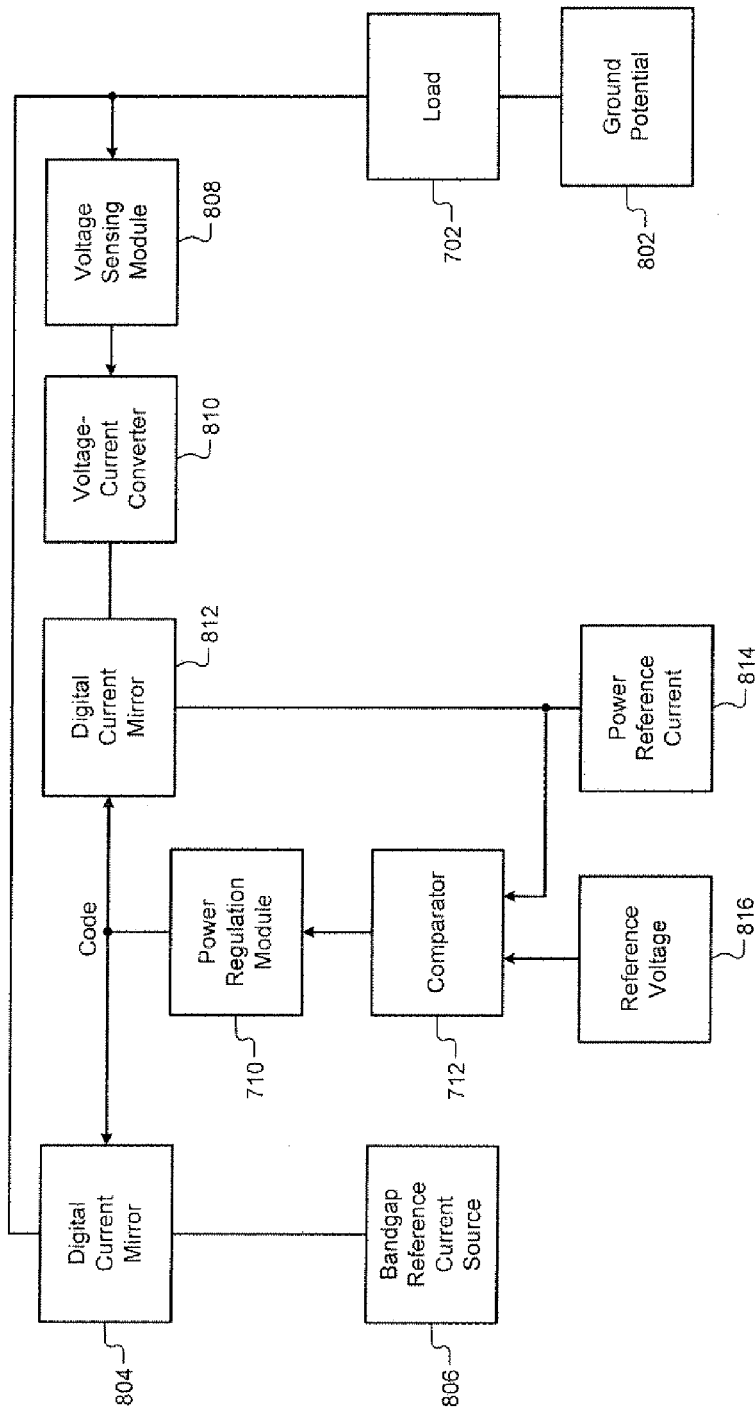
FIG. 9 is a more detailed functional block diagram of an exemplary implementation according to the principles of the present disclosure of the constant power circuit of FIG. 8.

Referring now to FIG. 9, a more detailed functional block diagram of an exemplary implementation of the constant power circuit of FIG. 8 is presented. The load 702 is connected to a ground potential 802. The load 702 is provided with a current by a digital current mirror 804. The digital current mirror receives a current from a bandgap reference current source 806.

Based upon the code received from the power regulation module 710, the digital current mirror 804 mirrors a multiple of the current from the bandgap reference current source 806 to the load 702. The voltage produced across the load 702 is detected by a voltage sensing module 808. A voltage output of the voltage sensing module 808 is converted to a current by a voltage-to-current converter 810.

The current from the voltage-to-current converter 810 is provided to a second digital current mirror 812. The second digital current mirror 812 also receives the code from the power regulation module 710. The second digital current mirror 812 mirrors a multiple of the current from the voltage-to-current converter 810 and provides this current to a first input of the comparator 712.

A power reference current source 814 also provides a reference current to the first input of the comparator 712. The first input of the comparator 712 is a high impedance node whose voltage is affected by differences in the currents from the second digital current mirror 812 and the power reference current source 814. A reference voltage source 816 provides a voltage to which the first input of the comparator is compared.

For example only, if the voltage at the first input of the comparator 712 is higher than the reference voltage, the current from the second digital current mirror 812 may be greater than from the power reference current source 814. Similarly, when the first input of the comparator 712 is below the reference voltage, the current from the power reference current source 814 may be greater. The power regulation module 710 uses the output of the comparator 712 to vary the code sent to the digital current mirrors 804 and 812.

Figure 10:
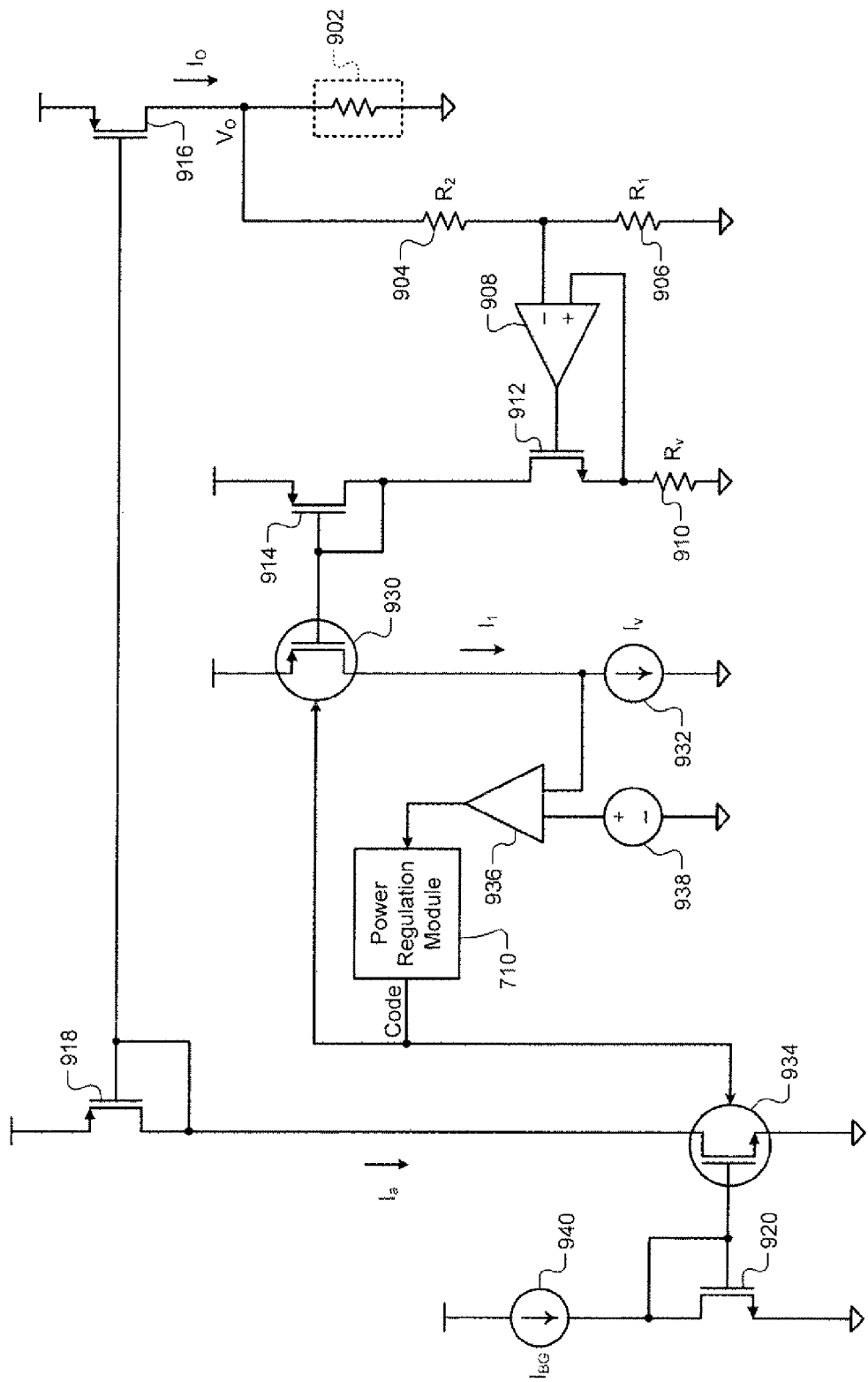
FIGS. 10-10A are functional schematics of exemplary implementations according to the principles of the present disclosure of the constant power circuit of FIG. 9.
Figure 11:
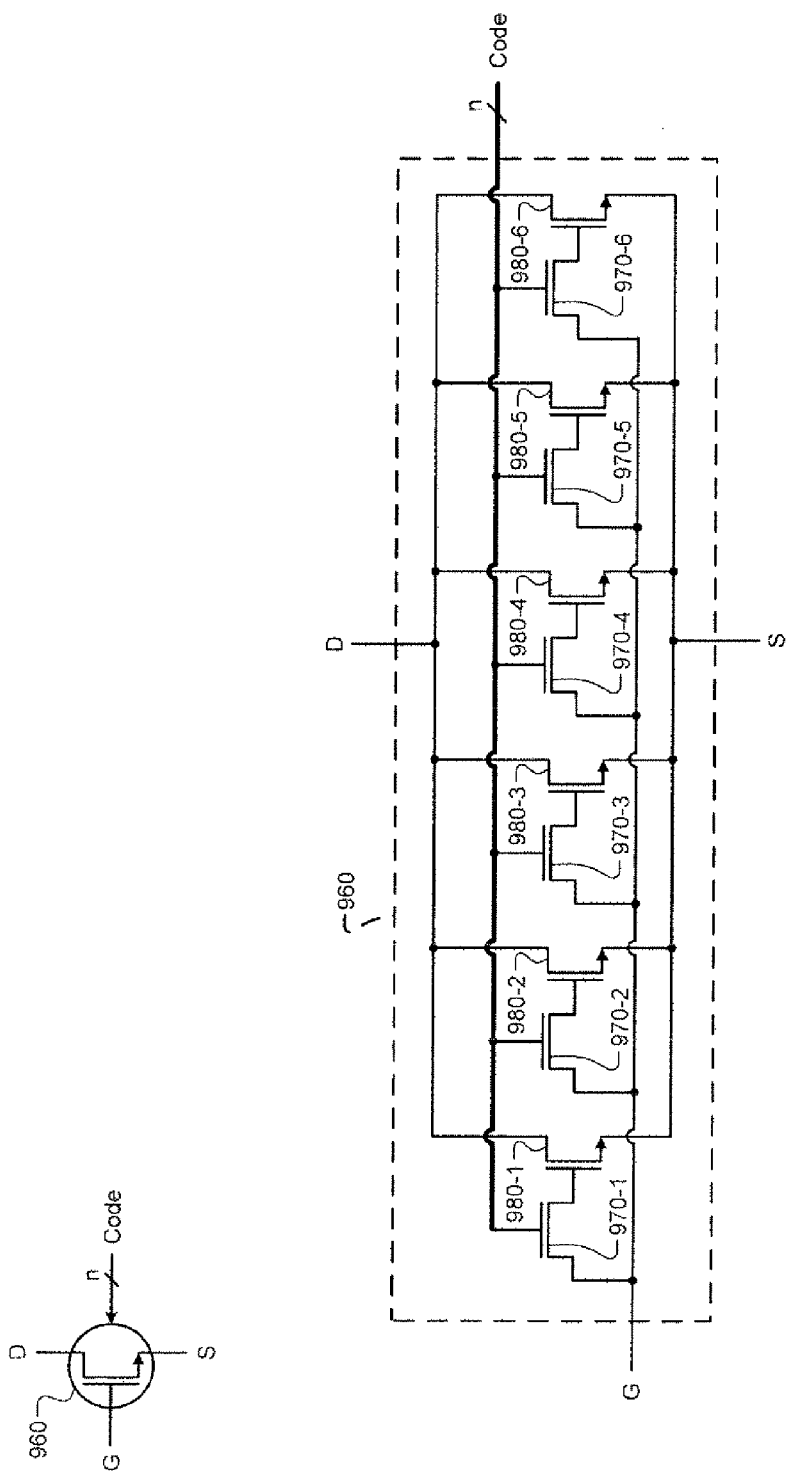
FIG. 11 is a functional schematic of an exemplary implementation according to the principles of the present disclosure of the second digitally-controlled current source 934 of FIG. 10.

Referring now to FIG. 10, a functional schematic depicts an exemplary implementation of the constant power circuit of FIG. 9. The load 702 of FIG. 9 is represented by a load resistance 902. The load resistance 902 has a first end connected to a first end of a resistance $R_2$ 904 and a second end connected to a ground potential.

A second end of the resistance $R_2$ 904 is connected to a first end of a resistance $R_1$ 906. A second end of the resistance $R_1$ 906 is connected to the ground potential. The first end of the resistance $R_1$ 906 is connected to an inverting input of an operational amplifier 908. A first end of a resistance $R_v$ 910 is connected to a non-inverting input of the operational amplifier 908. A second end of the resistance $R_v$ 910 is connected to the ground potential.

FIG. 10 includes transistors 912, 914, 916, 918, and 920, which may be MOSFETs that have gates, sources, and drains. The transistors 914, 916, and 918 may be p-channel MOSFETs, while the transistors 912 and 920 may be n-channel MOSFETs. The first end of the resistance $R_v$ 910 is connected to the source of the transistor 912. The gate of the transistor 912 is connected to an output of the operational amplifier 908.

The drain of the transistor 912 is connected to the drain and gate of the transistor 914. The source of the transistor 914 is connected to a supply potential. The resistances $R_1$ and $R_2$ 906 and 904 form a voltage divider to measure an output voltage $V_O$ across the load resistance 902. The values of the resistances $R_1$ and $R_2$ 906 and 904 may be chosen to be much larger than the load resistance 902. In this way, the current flowing through the resistances $R_1$ and $R_2$ 906 and 904 is insignificant compared to the current flowing through the load resistance 902.

The operational amplifier 908 forces the voltages at its inputs to be approximately equal. The voltage across the resistance $R_v$ 910 is therefore equal to $V_O$ as scaled by the voltage divider. The voltage drop across the resistance $R_v$ 910 then creates a current proportional to the scaled $V_O$. This current also flows through the transistor 914 and is mirrored to a digitally-controlled current mirror 930.

The digitally-controlled current mirror 930 has a digital input, code, which is received from the power regulation module 710. The digitally-controlled current source 930 has a first terminal, which is connected to a supply potential, and a second terminal, which is connected to a first terminal of a current source 932.

For example only, the digitally-controlled current source 930 may include p-channel MOSFETs, and is represented graphically in FIG. 10 as a p-channel MOSFET within a circle. A second digitally-controlled current source 934 may include n-channel MOSFETs, and is represented graphically in FIG. 10 as an n-channel MOSFET within a circle. An exemplary implementation of the second digitally-controlled current source 934 is presented in more detail with respect to FIG. 11. The digitally-controlled current source 930 may be implemented similarly to the second digitally-controlled current source 934.

The digitally-controlled current source 930 mirrors the current flowing through the transistor 914 by a variable ratio. Normally, a current mirror minors current by a fixed ratio, which may be determined by the widths and lengths of the transistors in the current mirror. The digitally-controlled current source 930 varies the current mirror ratio based on the code from the power regulation module 710.

The digitally-controlled current source 930 therefore outputs a current equal to the current through the transistor 914 multiplied by a factor determined by the code. The first terminal of the current source 932 is connected to a first input of a comparator 936. The current source 932 generates a current $I_v$, and may be connected to the ground potential.

The difference between the current flowing through the digitally-controlled current source 930 and the current source 932 determines the voltage at the first input of the comparator 936. A second input of the comparator 936 is connected to a reference voltage source 938. The reference voltage source 938 may be grounded. An output of the comparator 936 is provided to the power regulation module 710, which can vary its digital output based upon the output of the comparator 936.

The code is also provided to the second digitally-controlled current source 934. The second digitally-controlled current source 934 has a first terminal connected to the drain of the transistor 918, a second terminal connected to the ground potential, and a control terminal connected to the gate of the transistor 920. The gate of the transistor 920 is also connected to the drain of the transistor 920 and to a first terminal of a current source 940.

A second terminal of the current source 940 may be connected to the supply potential. The current flowing through the current source 940 is labeled $I_{BG}$, and also flows through the transistor 920. The transistor 920 mirrors the current $I_{BG}$ from the current source 940 to the second digitally-controlled current source 934. The second digitally-controlled current source 934 sources a current proportional to the current flowing through the transistor 920.

The ratio between the currents flowing through the second digitally-controlled current source 934 and the transistor 920 is controlled by the code. The current flowing through the second digitally-controlled current source 934 is named $I_a$. The drain of the transistor 918 is connected to the gates of the transistors 918 and 916. The transistor 916 therefore sources a current proportional to the current flowing through the transistor 918. The current flowing through the load resistance 902 is denoted $I_O$.

The current $I_a$ flowing through the second digitally-controlled current source 934 is controlled as follows: $I_a = K_{code} \cdot I_{BG}$, where $K_{code}$ is determined by the code from the power regulation module 710. The current $I_{BG}$ may be generated by applying a bandgap voltage across a resistor:

$$I_{BG} = \frac{V_{BG}}{R_a}.$$

The current or formed by transistors 918 and 916 has a ratio, which can be named $K_a$. The current $I_O$ is therefore:

$$I_o = K_a \cdot I_a = K_a \cdot K_{code} \cdot \frac{V_{BG}}{R_a}.$$

The voltage at the inverting input of the operational amplifier 908 is equal to $V_O \cdot K_v$, where $$K_v = \frac{R_1}{R_1 + R_2}.$$

The voltage at the inverting input of the operational amplifier 908 will be dropped across the resistor $R_v$ 910, producing a current equal to $$\frac{V_O \cdot K_v}{R_v}.$$

This current will be mirrored by the digitally-controlled current source 930 according to the code. Therefore, the current from the digitally-controlled current source 930 is $$I_1 = \frac{V_O \cdot K_v}{R_v} \cdot K_{code}.$$

The comparator 936 may detect when $I_1$ is equal to $I_v$ based upon a comparison of the voltage at its first input to the reference voltage from the reference voltage source 938. The power regulation module 710 may then control the code to keep $I_1$ and $I_v$ equal. In such a case, $$I_1 = I_v = \frac{V_O \cdot K_v}{R_v} \cdot K_{code}.$$

Rearranging the equation, $$V_O = \frac{I_v \cdot R_v}{K_v \cdot K_{code}}.$$

Substituting $V_O$ and $I_O$ into the equation for power yields:

$$\text{Power} = I_O \cdot V_O = \left[\text{code} \cdot K_a \cdot \frac{V_{BG}}{R_a}\right]\left[\frac{I_V \cdot R_V}{K_V \cdot K_{code}}\right] = \frac{K_a}{K_v} \cdot \frac{R_v}{R_a} \cdot V_{BG} \cdot I_V.$$

The power at the load resistance 902 is therefore controlled by the current $I_v$ and well-defined constants. $K_a$ is a ratio of transistor widths and lengths; $K_v$ is a ratio of resistors. $R_v/R_a$ is another resistor ratio, and $V_{BG}$ is a well-defined bandgap reference voltage. The power at the load resistance 902 is therefore linearly related to the current $I_v$.

Figure 10A:
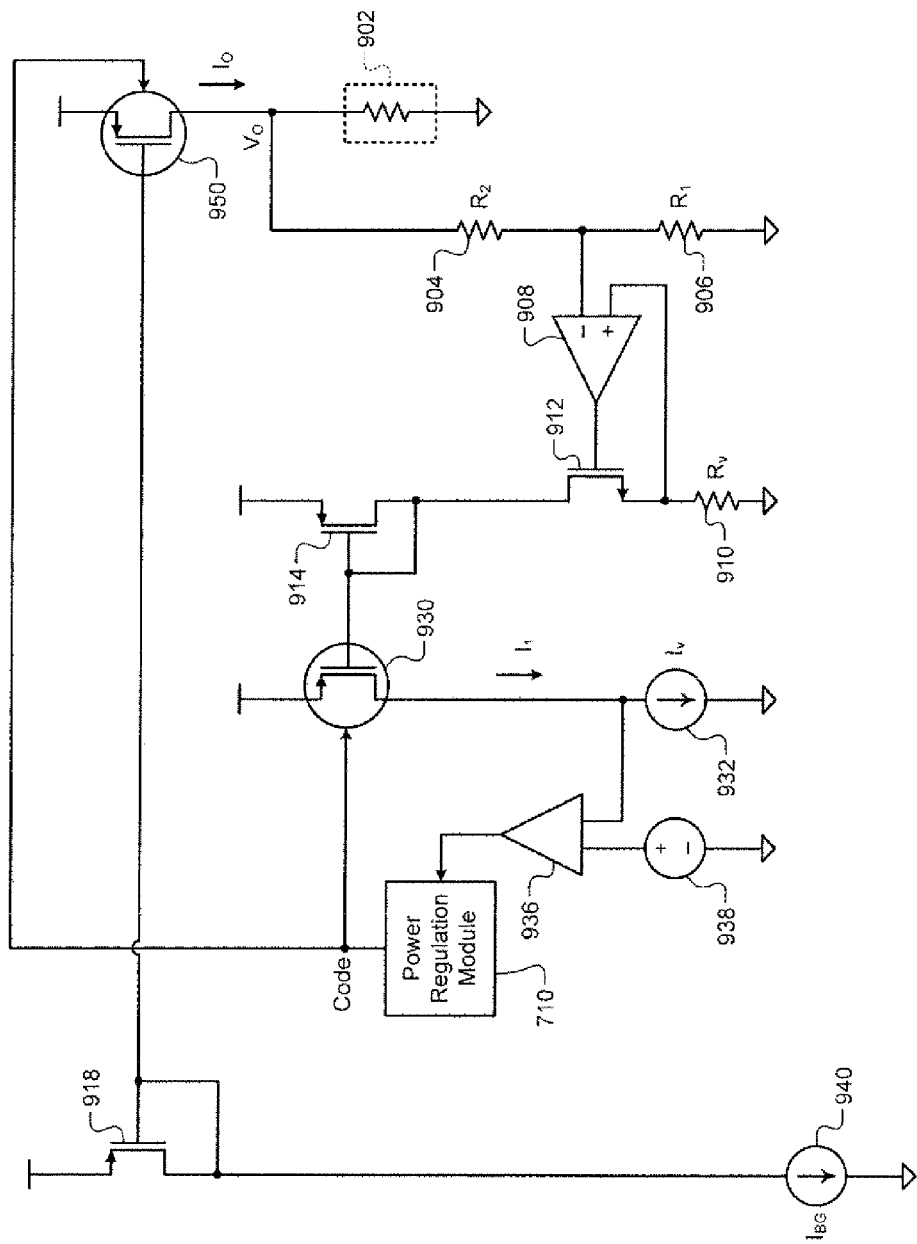

Referring now to FIG. 10A, a functional schematic depicts another exemplary implementation of the constant power circuit of FIG. 9. The current source 940 is now connected to the ground potential. The current flowing through the current source 940 also flows through the transistor 918. The ratio between the currents flowing through a second digitally-controlled current source 950 and the transistor 918 is controlled by the code. The current flowing through the second digitally-controlled current source 950 is the output current $I_O$, which flows through the load resistance 902.

Referring now to FIG. 11, a functional schematic of an exemplary implementation of the second digitally-controlled current source 934 of FIG. 10 is shown. A symbol for a digitally-controlled current source 960 is shown in the upper left of FIG. 11. The digitally-controlled current source 960 includes a gate, or control, terminal, and drain and source terminals.

The digitally-controlled current source 960 receives an n-bit digital value, referred to as the code. For example only, FIG. 11 depicts an implementation where n is equal to six. The digitally-controlled current source 960 includes six pass transistors 970-1, 970-2, 970-3, 970-4, 970-5, and 970-6. The pass transistors 970 may be MOSFETs that have gates and first and second terminals.

The first terminals of the pass transistors 970 are connected to the gate input of the digitally-controlled current source 960. The gates of the pass transistors 970 each receive one of the bits of the n-bit code. The digitally-controlled current source 960 includes first second, third, fourth, fifth, and sixth transistors 980-1, 980-2, 980-3, 980-4, 980-5, and 980-6. The transistors 980 may be MOSFETs that have gates, drains, and sources. In various implementations, the transistors 980 may be n-channel MOSFETs.

The gate of each of the transistors 980 is connected to the second terminal of the corresponding pass transistor 970. The sources of the transistors 980 are connected to the source terminal of the digitally-controlled current source 960. The drains of the transistors 980 are connected to the drain terminal of the digitally-controlled current source 960.

The code therefore controls which of the transistors 980 receive a signal at their gate. The sizes of the transistors 980 may have a binary relationship. For example, all but one of the transistors 980 may have a width-to-length ratio that is double that of one of the other transistors 980. When the code contains a 1 for all the pass transistors 970, the digitally-controlled current source 960 will output the greatest amount of current for a given input gate voltage.

The code will likely not be all zeroes, because then the digitally-controlled current source 960 would mirror zero current. The least amount of mirroring will thus occur when the code contains a single 1 value that corresponds to the pass transistor 970 for the smallest transistor 980. A current mirror having a mirroring ratio determined by the code can be created by connecting the gate of the digitally-controlled current source 960 to the gate of another transistor. For example, in FIG. 10, the second digitally-controlled current source 934 multiplies the current $I_{BG}$ by a value determined by the code.

Figure 12B:
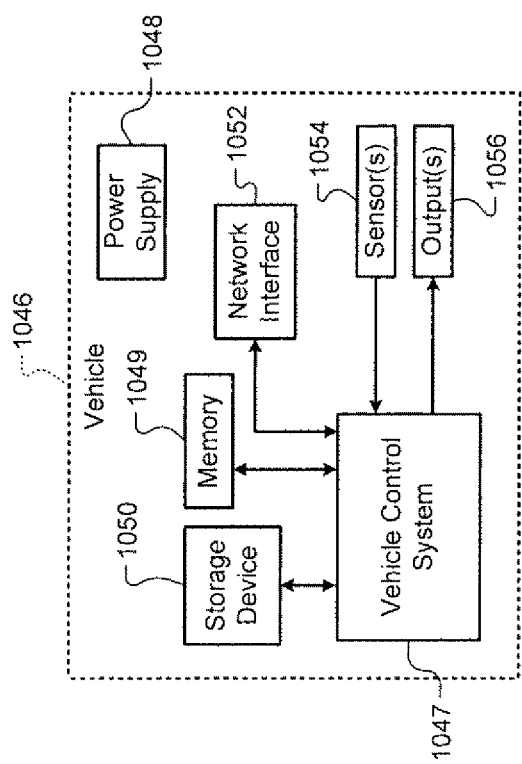
FIG. 12B is a functional block diagram of a vehicle control system.
Figure 12A:
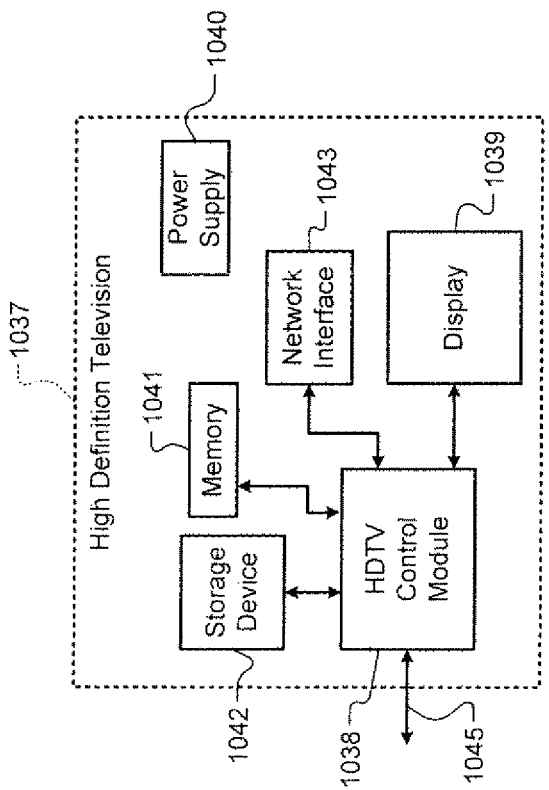
FIG. 12A is a functional block diagram of a high definition television.

Referring now to FIGS. 12A-12D, various exemplary implementations incorporating the teachings of the present disclosure are shown. Referring now to FIG. 12A, the teachings of the disclosure can be implemented in a storage device 1042 of a high definition television (HDTV) 1037. The HDTV 1037 includes an HDTV control module 1038, a display 1039, a power supply 1040, memory 1041, the storage device 1042, a network interface 1043, and an external interface 1045. If the network interface 1043 includes a wireless local area network interface, an antenna (not shown) may be included.

The HDTV 1037 can receive input signals from the network interface 1043 and/or the external interface 1045, which can send and receive data via cable, broadband Internet, and/or satellite. The HDTV control module 1038 may process the input signals, including encoding, decoding, filtering, and/or formatting, and generate output signals. The output signals may be communicated to one or more of the display 1039, memory 1041, the storage device 1042, the network interface 1043, and the external interface 1045.

Memory 1041 may include random access memory (RAM) and/or nonvolatile memory. Nonvolatile memory may include any suitable type of semiconductor or solid-state memory, such as flash memory (including NAND and NOR flash memory), phase change memory, magnetic RAM, and multi-state memory, in which each memory cell has more than two states. The storage device 1042 may include an optical storage drive, such as a DVD drive, and/or a hard disk drive (HDD). The HDTV control module 1038 communicates externally via the network interface 1043 and/or the external interface 1045. The power supply 1040 provides power to the components of the HDTV 1037.

Referring now to FIG. 12B, the teachings of the disclosure may be implemented in a storage device 1050 of a vehicle 1046. The vehicle 1046 may include a vehicle control system 1047, a power supply 1048, memory 1049, the storage device 1050, and a network interface 1052. If the network interface 1052 includes a wireless local area network interface, an antenna (not shown) may be included. The vehicle control system 1047 may be a powertrain control system, a body control system, an entertainment control system, an anti-lock braking system (ABS), a navigation system, a telematics system, a lane departure system, an adaptive cruise control system, etc.

The vehicle control system 1047 may communicate with one or more sensors 1054 and generate one or more output signals 1056. The sensors 1054 may include temperature sensors, acceleration sensors, pressure sensors, rotational sensors, airflow sensors, etc. The output signals 1056 may control engine operating parameters, transmission operating parameters, suspension parameters, etc.

The power supply 1048 provides power to the components of the vehicle 1046. The vehicle control system 1047 may store data in memory 1049 and/or the storage device 1050. Memory 1049 may include random access memory (RAM) and/or nonvolatile memory. Nonvolatile memory may include any suitable type of semiconductor or solid-state memory, such as flash memory (including NAND and NOR flash memory), phase change memory, magnetic RAM, and multi-state memory, in which each memory cell has more than two states. The storage device 1050 may include an optical storage drive, such as a DVD drive, and/or a hard disk drive (HDD). The vehicle control system 1047 may communicate externally using the network interface 1052.

Figure 12D:
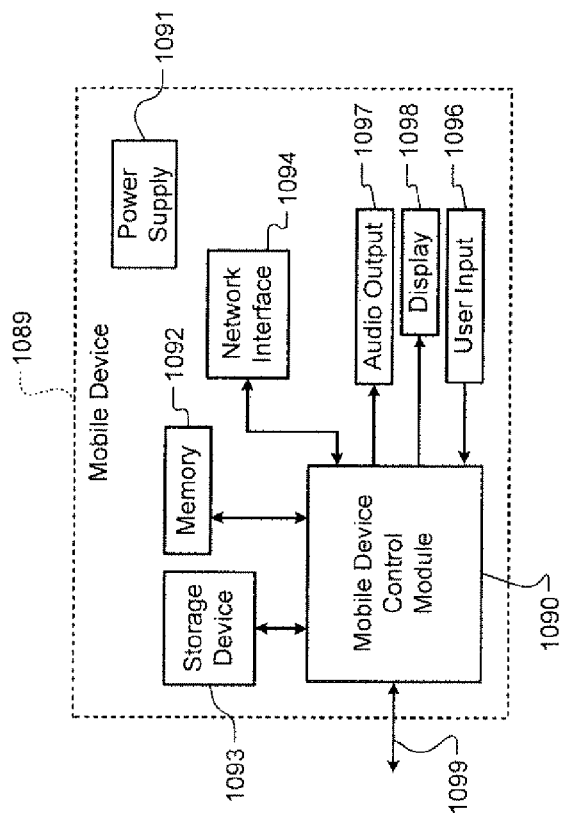
FIG. 12D is a functional block diagram of a mobile device.
Figure 12C:
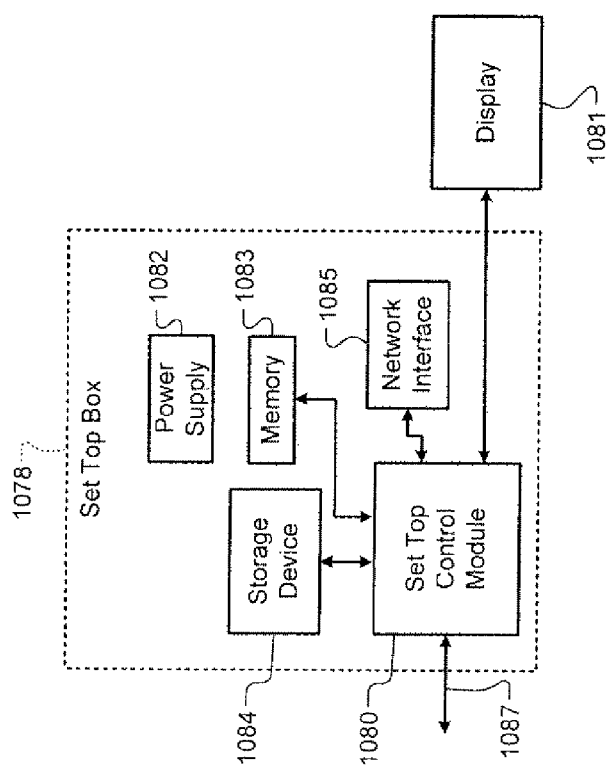
FIG. 12C is a functional block diagram of a set top box.

Referring now to FIG. 12C, the teachings of the disclosure can be implemented in a storage device 1084 of a set top box 1078. The set top box 1078 includes a set top control module 1080, a display 1081, a power supply 1082, memory 1083, the storage device 1084, and a network interface 1085. If the network interface 1085 includes a wireless local area network interface, an antenna (not shown) may be included.

The set top control module 1080 may receive input signals from the network interface 1085 and an external interface 1087, which can send and receive data via cable, broadband Internet, and/or satellite. The set top control module 1080 may process signals, including encoding, decoding, filtering and/or formatting, and generate output signals. The output signals may include audio and/or video signals in standard and/or high definition formats. The output signals may be communicated to the network interface 1085 and/or to the display 1081. The display 1081 may include a television, a projector, and/or a monitor.

The power supply 1082 provides power to the components of the set top box 1078. Memory 1083 may include random access memory (RAM) and/or nonvolatile memory. Nonvolatile memory may include any suitable type of semiconductor or solid-state memory, such as flash memory (including NAND and NOR flash memory), phase change memory, magnetic RAM, and multi-state memory, in which each memory cell has more than two states. The storage device 1084 may include an optical storage drive, such as a DVD drive, and/or a hard disk drive (HDD).

Referring now to FIG. 12D, the teachings of the disclosure can be implemented in a storage device 1093 of a mobile device 1089. The mobile device 1089 may include a mobile device control module 1090, a power supply 1091, memory 1092, the storage device 1093, a network interface 1094, and an external interface 1099. If the network interface 1094 includes a wireless local area network interface, an antenna (not shown) may be included.

The mobile device control module 1090 may receive input signals from the network interface 1094 and/or the external interface 1099. The external interface 1099 may include USB, infrared and/or Ethernet. The input signals may include compressed audio and/or video, and may be compliant with the MP3 format. Additionally, the mobile device control module 1090 may receive input from a user input 1096 such as a keypad, touchpad, or individual buttons. The mobile device control module 1090 may process input signals, including encoding, decoding, filtering, and/or formatting, and generate output signals.

The mobile device control module 1090 may output audio signals to an audio output 1097 and video signals to a display 1098. The audio output 1097 may include a speaker and/or an output jack. The display 1098 may present a graphical user interface, which may include menus, icons, etc. The power supply 1091 provides power to the components of the mobile device 1089. Memory 1092 may include random access memory (RAM) and/or nonvolatile memory.

Nonvolatile memory may include any suitable type of semiconductor or solid-state memory, such as flash memory (including NAND and NOR flash memory), phase change memory, magnetic RAM, and multi-state memory, in which each memory cell has more than two states. The storage device 1093 may include an optical storage drive, such as a DVD drive, and/or a hard disk drive (HDD). The mobile device may include a personal digital assistant, a media player, a laptop computer, a gaming console, or other mobile computing device.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. A system for providing a desired power to a load, the system comprising:
    a current detection module configured to generate a current signal based on a current flowing through the load;
    a voltage detection module configured to generate a voltage signal based on a voltage across the load;
    a multiplier module configured to generate an output signal based on an analog multiplication of i) the current signal and ii) the voltage signal;
    a comparing module configured to perform a comparison of the output signal to a power reference signal, wherein the power reference signal is based on the desired power;
    a voltage source configured to control the voltage across the load based on the comparison of the output signal to the power reference signal; and
    a reference voltage generator configured to generate a reference signal based on the comparison of the output signal to the power reference signal, wherein:
    the voltage source is configured to generate the voltage across the load based on the reference signal,
    the reference signal is differential and comprises two single-ended reference signals, and
    the voltage source comprises:
        two operational amplifiers with first inputs, second inputs, and outputs, respectively, and
        two voltage-controlled current sources with control terminals in communication with a respective one of the outputs of the two operational amplifiers.

2. The system of claim 1, wherein the voltage detection module comprises a differential amplifier.

3. The system of claim 1, wherein the reference voltage generator is configured to:
    generate current based on the comparison of the output signal to the power reference signal; and
    generate each of the two single-ended reference signals from the current.

4. The system of claim 3, wherein the reference voltage generator includes a pair of resistors, and each resistor is configured to generate a respective single-ended reference signal by applying the current.

5. The system of claim 1, wherein each of the first inputs of the two operational amplifiers is configured to receive a respective single-ended reference signal.

6. The system of claim 5, wherein the second inputs of the two operational amplifiers communicate with first and second ends of the load, respectively.

7. The system of claim 6, wherein first terminals of the voltage-controlled current sources are in communication with the first and second ends of the load, respectively.

8. The system of claim 7, wherein the first terminals of the voltage-controlled current sources are in communication with the first and second ends of the load via first and second resistances, respectively.

9. The system of claim 1, wherein:
    the multiplier module is configured to generate the output signal by multiplying a first current by a second current and dividing by a predetermined constant current;
    the first current is based on the current signal; and
    the second current is based on the voltage signal.

10. The system of claim 1, further comprising a control module configured to generate the power reference signal based on a digital input.

11. The system of claim 1, further comprising a power regulation module configured to instruct the voltage source to increase the voltage across the load when the comparison of the output signal to the power reference signal indicates that the output signal is less than the power reference signal.

12. The system of claim 11, wherein the power regulation module generates a digital control signal based on the comparison of the output signal to the power reference signal, and wherein the voltage source is configured to control the voltage across the load based on the digital control signal.

13. The system of claim 12, further comprising:
    a digital to analog converter configured to convert the digital control signal into a control current; and
    a reference voltage generator configured to generate a reference voltage based on the control current, wherein the voltage source controls the voltage across the load based on the reference voltage.

14. The system of claim 13, wherein the reference voltage is differential.

15. The system of claim 1, wherein the current detection module is configured to determine the current signal based on a measurement of the current flowing through the load, and wherein the voltage detection module is configured to determine the voltage signal based on a measurement of the voltage across the load.

16. A system for providing a desired power to a load, the system comprising:
    a current detection module configured to generate a current signal based on a current flowing through the load;
    a voltage detection module configured to generate a voltage signal based on a voltage across the load;
    a multiplier module configured to generate an output signal based on an analog multiplication of i) the current signal and ii) the voltage signal;
    a comparing module configured to perform a comparison of the output signal to a power reference signal, wherein the power reference signal is based on the desired power; and
    a voltage source configured to control the voltage across the load based on the comparison of the output signal to the power reference signal, wherein:

the multiplier module comprises an analog current multiplier, the multiplier module is configured to generate the output signal by multiplying a first current by a second current and dividing by a predetermined constant current, the first current is based on the current signal, and the second current is based on the voltage signal.

17. A system for providing a desired power to a load, the system comprising:

a current detection module configured to generate a current signal based on a current flowing through the load;

a voltage detection module configured to generate a voltage signal based on a voltage across the load;

a multiplier module configured to generate an output signal based on an analog multiplication of i) the current signal and ii) the voltage signal;

a comparing module configured to perform a comparison of the output signal to a power reference signal, wherein the power reference signal is based on the desired power;

a voltage source configured to control the voltage across the load based on the comparison of the output signal to the power reference signal;

a power regulation module configured to instruct the voltage source to increase the voltage across the load when the comparison of the output signal to the power reference signal indicates that the output signal is less than the power reference signal, wherein the power regulation module generates a digital control signal based on the comparison of the output signal to the power reference signal, and wherein the voltage source is configured to control the voltage across the load based on the digital control signal;

a digital to analog converter configured to convert the digital control signal into a control current; and a reference voltage generator configured to generate a reference voltage based on the control current, wherein the voltage source controls the voltage across the load based on the reference voltage.

18. A system for providing a desired power to a load, the system comprising:

a current detection module configured to generate a current signal based on a current flowing through the load;

a voltage detection module configured to generate a voltage signal based on a voltage across the load;

a multiplier module configured to generate an output signal based on an analog multiplication of i) the current signal and ii) the voltage signal;

a comparing module configured to perform a comparison of the output signal to a power reference signal, wherein the power reference signal is based on the desired power;

a voltage source configured to control the voltage across the load based on the comparison of the output signal to the power reference signal;

a digital to analog converter configured to convert a digital control signal based on the comparison of the output signal to the power reference signal into a control current; and a reference voltage generator configured to generate a reference voltage based on the control current, wherein the voltage source controls the voltage across the load based on the reference voltage.

19. A system for providing a desired power to a load, the system comprising:

a current detection module configured to generate a current signal based on a current flowing through the load;

a voltage detection module configured to generate a voltage signal based on a voltage across the load;

a multiplier module configured to generate an output signal based on an analog multiplication of i) the current signal and ii) the voltage signal;

a comparing module configured to perform a comparison of the output signal to a power reference signal, wherein the power reference signal is based on the desired power; and a voltage source configured to control the voltage across the load based on the comparison of the output signal to the power reference signal, wherein the voltage source comprises:

two operational amplifiers with first inputs, second inputs, and outputs, respectively, and two voltage-controlled current sources with control terminals in communication with a respective one of the outputs of the two operational amplifiers.

* * * * *